(12) United States Patent
Chun

(10) Patent No.: US 11,288,015 B2
(45) Date of Patent: Mar. 29, 2022

(54) MEMORY SYSTEM FOR ACCURATELY PREDICTING POWER REQUIRED FOR SEQUENTIAL COMMAND OPERATIONS PERFORMED IN MEMORY DEVICE, AND OPERATION METHOD THEREOF

(71) Applicant: SK hynix Inc., Icheon (KR)

(72) Inventor: Dong Yeob Chun, Icheon (KR)

(73) Assignee: SK hynix Inc., Icheon (KR)

(*) Notice: Subject to any disclaimer, the term of this patent is extended or adjusted under 35 U.S.C. 154(b) by 53 days.

(21) Appl. No.: 16/939,834

(22) Filed: Jul. 27, 2020

(65) Prior Publication Data
US 2021/0278999 A1    Sep. 9, 2021

(30) Foreign Application Priority Data

Mar. 5, 2020   (KR) .................. 10-2020-0027701

(51) Int. Cl.
| | |
|---|---|
| G06F 3/06 | (2006.01) |
| G06F 13/12 | (2006.01) |
| G06N 5/04 | (2006.01) |
| G06F 1/3225 | (2019.01) |
| G11C 5/04 | (2006.01) |
| G11C 16/26 | (2006.01) |

(52) U.S. Cl.
CPC .......... *G06F 3/0659* (2013.01); *G06F 3/0604* (2013.01); *G06F 3/0653* (2013.01); *G06F 3/0673* (2013.01); *G06F 13/12* (2013.01); *G06N 5/04* (2013.01)

(58) Field of Classification Search
CPC ............ G06F 3/06; G06F 12/02; G06F 12/10
See application file for complete search history.

(56) References Cited

U.S. PATENT DOCUMENTS 9,443,600 B2    9/2016   Ghalam et al.

FOREIGN PATENT DOCUMENTS

KR         101772592 B1    8/2017

*Primary Examiner* — Getente A Yimer

(57) ABSTRACT

A memory system may include: a memory device comprising a plurality of memory dies; and a controller configured to perform: analyzing a first and second commands when the first and second commands are sequentially transferred to any one selected memory die of the plurality of memory dies, identifying first and third operations of the first command and second and fourth operations of the second command, calculating a single power which is expected to be used in one or more single operation sections in which only any one respective operation of the first to fourth operations is performed, calculating an overlap power which is expected to be used in one or more overlap operation sections in which a respective plurality of operations of the first to fourth operations are performed while overlapping each other, calculating a total power which is expected to be used when the first and second commands are performed in the selected memory die by adding the single power and the overlap power according to operation time points of the first to fourth operations.

19 Claims, 9 Drawing Sheets

MEMORY SYSTEM FOR ACCURATELY PREDICTING POWER REQUIRED FOR SEQUENTIAL COMMAND OPERATIONS PERFORMED IN MEMORY DEVICE, AND OPERATION METHOD THEREOF

CROSS-REFERENCE TO RELATED APPLICATION

This application claims priority under 35 U.S.C. § 119 to Korean Patent Application No. 10-2020-0027701 filed on Mar. 5, 2020, which is incorporated herein by reference in its entirety.

BACKGROUND

1. Field

Embodiments relate to a memory system, and more particularly, to a memory system including a plurality of memory devices and an operation method thereof.

2. Discussion of the Related Art

Recently, a computer environment paradigm has shifted to ubiquitous computing, which enables a computer system to be accessed virtually anytime and everywhere. As a result, the use of portable electronic devices such as mobile phones, digital cameras, notebook computers and the like has increased. Such portable electronic devices typically use or include a memory system that uses or embeds at least one memory device, i.e., a data storage device. The data storage device can be used as a main storage device or an auxiliary storage device of a portable electronic device.

In a computing device, a data storage device using a nonvolatile semiconductor memory device is advantageous compared to a hard disk as it has excellent stability and durability because it has no mechanical driving part (e.g., a mechanical arm), and has high data access speed and low power consumption. Examples of such a data storage device include a universal serial bus (USB) memory device, a memory card having various interfaces, and a solid state drive (SSD).

SUMMARY

Various embodiments are directed to a memory system capable of accurately predicting power required for performing two or more commands, when sequentially transferring two or more commands to any one selected memory device among a plurality of memory devices included in a memory system.

In an embodiment, a memory system may include: a memory device comprising a plurality of memory dies; and a controller configured to perform: analyzing a first command and a second command when the first and second commands are sequentially transferred to any one selected memory die of the plurality of memory dies, analyzing the first command and second command including identifying first and third operations of the first command and second and fourth operations of the second command, wherein the first operation and the second operation are not be able to be performed while operation sections thereof overlap each other, wherein the third operation is able to be performed while an operation section thereof overlaps an operation section of the second operation, and wherein the fourth operation is able to be performed while an operation section thereof overlaps an operation section of the first operation, calculating a single power which is expected to be used in one or more single operation sections in which only any one respective operation of the first to fourth operations is performed, calculating an overlap power which is expected to be used in one or more overlap operation sections in which a respective plurality of operations of the of the first to fourth operations are performed while overlapping each other, calculating a total power which is expected to be used when the first and second commands are performed in the selected memory die by adding the single power and the overlap power according to operation time points of the first to fourth operations, and calculating a peak power according to a largest value of the powers respectively expected to be used in the one or more overlap operation sections.

The controller may adjust the operation time points of the first to fourth operations such that the total power is minimized while the peak power is maintained at a value smaller than a predetermined reference value.

Calculating the overlap power may include: determining values of a plurality of preset weights according to the types of the first and second commands and the type of the selected memory die, calculating an operation current by applying the preset weights to two or more currents respectively corresponding to two or more operations which are performed while overlapping each other in one of the overlap operation sections, and calculating the overlap power by predicting that the operation current will be used in the overlap operation section.

When the first command is a first write command for storing first data in the selected memory die and the second command is a second write command for storing second data in the selected memory die, the controller: may identify, as the first operation, an operation of transferring the first data to the selected memory die and predicts that the first operation will be performed during a first section, may identify, as the third operation, an operation in which the selected memory die physically stores the first data therein after the first section and predicts that the third operation will be performed during a second section, may identify, as the second operation, an operation of transferring the second data to the selected memory die after the first section and predicts that the second operation will be performed during a third section overlapping the second section, and may identify, as the fourth operation, an operation in which the selected memory die physically stores the second data therein after the second and third sections and predicts that the fourth operation will be performed during a fourth section.

The controller may calculate the single power by adding up a first partial power obtained by predicting that a first current corresponding to the first operation will be used in the first section, a second partial power obtained by predicting that a third current corresponding to the third operation will be used in a part of the second section that does not overlap the third section, and a third partial power obtained by predicting that a fourth current corresponding to the fourth operation will be used in the fourth section, may calculate a first operation current by performing an operation on the third current and a second current corresponding to the second operation, and may calculate the peak power by predicting that the first operation current will be used in the third section.

The controller may calculate the first operation current by adding a current obtained by multiplying the second current by a first weight to a current obtained by multiplying the third current by a second weight.

When the first command is a first read command for reading third data from the selected memory die and the second command is a second read command for reading fourth data from the selected memory die, the controller: may identify, as the third operation, an operation in which the selected memory die physically reads the third data therein and predicts that the third operation will be performed during a fifth section, may identify, as the first operation, an operation of receiving the third data from the selected memory die after the fifth section and predicts that the first operation will be performed during a sixth section, may identify, as the fourth operation, an operation in which the selected memory die physically reads the fourth data therein after the third operation is started, and predicts that the fourth operation will be performed during a seventh section overlapping at least one of the fifth and sixth sections, and may identify, as the second operation, an operation of receiving the fourth data from the selected memory die after the sixth and seventh sections and predicts that the second operation will be performed during an eighth section.

The controller may calculate the single power by adding up a fourth partial power obtained by predicting that a third current corresponding to the third operation will be used in a part of the fifth section that does not overlap the seventh section, a fifth partial power obtained by predicting that a first current corresponding to the first operation will be used in a part of the sixth section that does not overlap the seventh section, and a sixth partial power obtained by predicting that a second current corresponding to the second operation will be used in the eighth section, may calculate a second operation current by performing an operation on the third current and a fourth current corresponding to the fourth operation and a third operation current by performing an operation on the first current and the fourth current, and may calculate the peak power which is expected to be used in the seventh section by predicting that the second operation current will be used in the seventh section overlapping the fifth section and predicting that the third operation current will be used in the seventh section overlapping the sixth section.

The controller may calculate the second operation current by adding a current obtained by multiplying the third current by a third weight to a current obtained by multiplying the fourth current by a fourth weight, and may calculate the third operation current by adding a current obtained by multiplying the first current by a fifth weight to a current obtained by multiplying the fourth current by a sixth weight.

The controller comprises: a command analysis unit suitable for identifying the first to fourth operations by analyzing each of the first and second commands; a power calculation unit suitable for calculating the single power, the peak power and the total power according to the operation time points of the first to fourth operations; a weight check unit suitable for determining the type of the selected memory die, and transferring weight information corresponding to the determination result to the power calculation unit; and an operation adjusting unit suitable for checking the result of the power calculation unit, and adjusting the operation time points of the first to fourth operations according to the check result.

In an embodiment, an operation method of a memory system which includes a memory device including a plurality of memory dies, the operation method may include: analyzing a first command and a second command when the first and second commands are sequentially transferred to a selected memory die of the plurality of memory dies, analyzing the first command and second command including identifying first and third operations of the first command and identifying second and fourth operations of the second command, wherein the first and second operations are not able to be performed while operation sections thereof overlap each other, wherein the third operation is able to be performed while an operation section thereof overlaps an operation section of the second operation, and wherein the fourth operation is able to be performed while an operation section thereof overlaps an operation section of the first operation; and calculating a single power which is expected to be used in one or more single operation sections in which only any one respective operation of the first to fourth operations is performed, calculating an overlap power which is expected to be used in one or more overlap operation sections in which a respective plurality of operations of the of the first to fourth operations are performed while overlapping each other, calculating total power which is expected to be used when the first and second commands are performed in the selected memory die by adding the single power and the overlap power according to operation time points of the first to fourth operations, and calculating a peak power according to a largest value of the powers respectively expected to be used in the one or more overlap operation sections.

The operation method may further include an adjusting step of adjusting the operation time points of the first to fourth operations such that the total power is minimized while the peak power calculated in the calculation step is maintained at a value smaller than a predetermined reference value.

Calculating the overlap power may include: determining values of a plurality of preset weights according to the types of the first and second commands and the type of the selected memory die, calculating an operation current by applying the preset weights to two or more currents respectively corresponding to two or more operations which are performed while overlapping each other in one of the overlap operation sections, and calculating the overlap power by predicting that the operation current will be used in the overlap operation section.

The operation method may further include: when the first command is a first write command for storing first data in the selected memory die and the second command is a second write command for storing second data in the selected memory die: identifying, as the first operation, an operation of transferring the first data to the selected memory die and predicting that the first operation will be performed during a first section; identifying, as the third operation, an operation in which the selected memory die physically stores the first data therein after the first section and predicting that the third operation will be performed during a second section; identifying, as the second operation, an operation of transferring the second data to the selected memory die after the first section and predicting that the second operation will be performed during a third section overlapping the second section; and identifying, as the fourth operation, an operation in which the selected memory die physically stores the second data therein after the second and third sections and predicting that the fourth operation will be performed during a fourth section.

The operation method may further include: calculating the single power by adding up a first partial power obtained by predicting that a first current corresponding to the first operation will be used in the first section, a second partial power obtained by predicting that a third current corresponding to the third operation will be used in a part of the second section that does not overlap the third section, and a third partial power obtained by predicting that a fourth current corresponding to the fourth operation will be used in the fourth section; calculating a first operation current by performing an operation on the third current and a second current corresponding to the second operation; and calculating the peak power by predicting that the first operation current will be used in the third section.

Calculating the first operation current may be performed by adding a current obtained by multiplying the second current by a first weight to a current obtained by multiplying the third current by a second weight.

The operation method may further include: when the first command is a first read command for reading third data from the selected memory die and the second command is a second read command for reading fourth data from the selected memory die: identifying, as the third operation, an operation in which the selected memory die physically reads the third data therein and predicting that the third operation will be performed during a fifth section; identifying, as the first operation, an operation of receiving the third data from the selected memory die after the fifth section and predicting that the first operation will be performed during a sixth section; identifying, as the fourth operation, an operation in which the selected memory die physically reads the fourth data therein after the third operation is started, and predicting that the fourth operation will be performed during a seventh section overlapping at least one of the fifth and sixth sections; and identifying, as the second operation, an operation of receiving the fourth data from the selected memory die after the sixth and seventh sections and predicting that the second operation will be performed during an eighth section.

The operation method may further include: calculating the single power by adding up a fourth partial power obtained by predicting that a third current corresponding to the third operation will be used in a part of the fifth section that does not overlap the seventh section, a fifth partial power obtained by predicting that a first current corresponding to the first operation will be used in a part of the sixth section that does not overlap the seventh section, and a sixth partial power obtained by predicting that a second current corresponding to the second operation will be used in the eighth section; calculating a second operation current by performing an operation on the third current and a fourth current corresponding to the fourth operation and a third operation current by performing an operation on the first current and the fourth current; and calculating the peak power which is expected to be used in the seventh section by predicting that the second operation current will be used in the seventh section overlapping the fifth section and predicting that the third operation current will be used in the seventh section overlapping the sixth section.

The operation method may further include: calculating the second operation current by adding a current obtained by multiplying the third current by a third weight to a current obtained by multiplying the fourth current by a fourth weight; and calculating the third operation current by adding a current obtained by multiplying the first current by a fifth weight to a current obtained by multiplying the fourth current by a sixth weight.

In accordance with the present embodiment, when two or more commands are sequentially transferred to any one selected memory device among the plurality of memory devices included in the memory system, the memory system may analyze operations included in each of the two or more commands which are supposed to be transferred, identify operations which can be performed while operation sections thereof overlap each other and operations which cannot be performed while operation sections thereof overlap each other, independently calculate powers required for the identified operations, and add up the calculated powers, thereby accurately predicting power required for performing the two or more commands.

DETAILED DESCRIPTION

Figure 1:
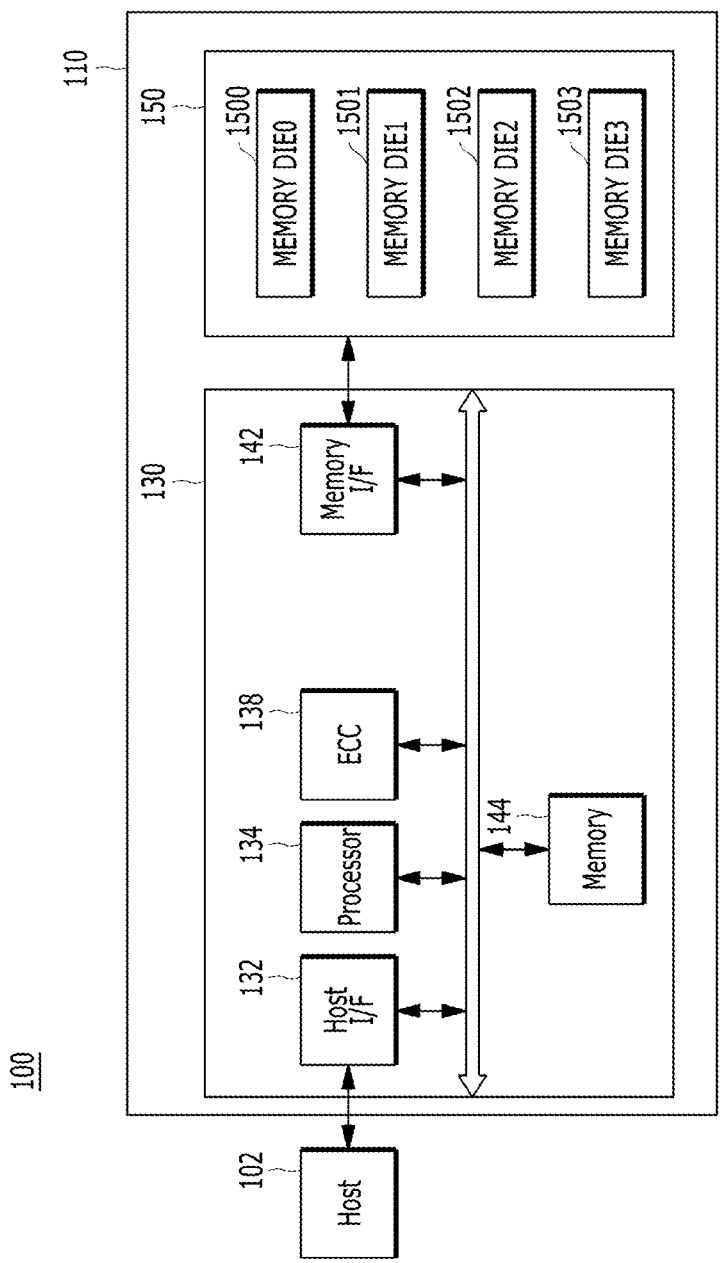
FIG. 1 illustrates a data processing system including a memory system in accordance with an embodiment.

Various examples of the disclosure are described below in more detail with reference to the accompanying drawings. Aspects and features of the present invention, however, may be embodied in different ways to form other embodiments, including variations of any of the disclosed embodiments. Thus, the invention is not to be construed as being limited to the embodiments set forth herein. Rather, the described embodiments are provided so that this disclosure is thorough and complete, and fully conveys the disclosure to those skilled in the art to which this invention pertains. Throughout the disclosure, like reference numerals refer to like parts throughout the various figures and examples of the disclosure. It is noted that reference to "an embodiment," "another embodiment" or the like does not necessarily mean only one embodiment, and different references to any such phrase are not necessarily to the same embodiment(s).

It will be understood that, although the terms "first", "second", "third", and so on may be used herein to identify various elements, these elements are not limited by these terms. These terms are used to distinguish one element from another element that otherwise have the same or similar names. Thus, a first element in one instance could be termed a second or third element in another instance without departing from the spirit and scope of the invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements therebetween. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention. As used herein, singular forms are intended to include the plural forms and vice versa, unless the context clearly indicates otherwise. Similarly, the indefinite articles "a" and "an" mean one or more, unless it is clear from the language or context that only one is intended.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the invention belongs in view of the disclosure. It will be further understood that terms, such as those defined in commonly used dictionaries, should be interpreted as having a meaning that is consistent with their meaning in the context of the disclosure and the relevant art, and not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the disclosure are described in detail below with reference to the accompanying drawings, wherein like numbers reference like elements.

FIG. 1 is a diagram illustrating an example of a data processing system 100 including a memory system 110 in accordance with an embodiment.

Figure 2:
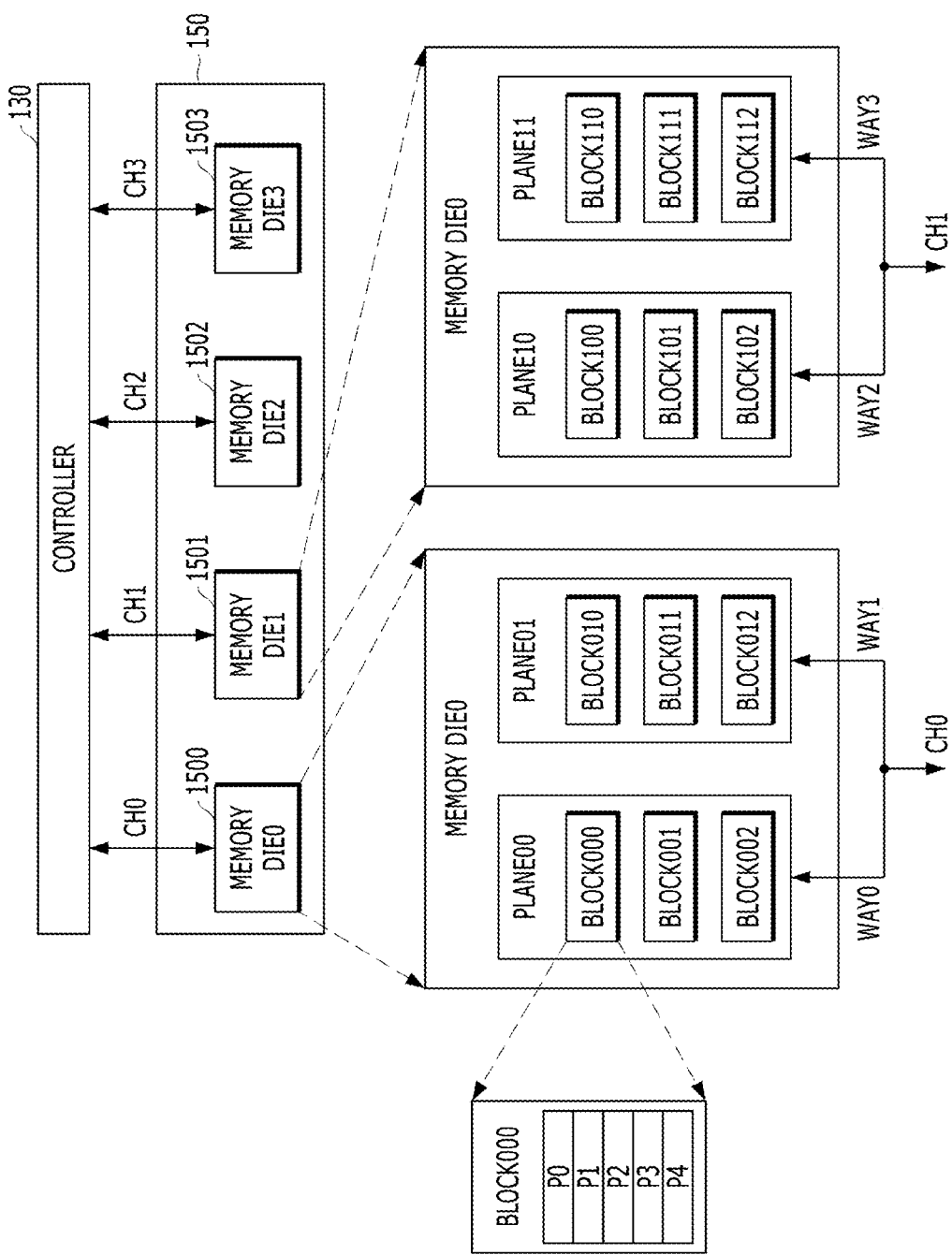
FIG. 2 illustrates a memory device included in the memory system in accordance with the present embodiment.

FIG. 2 is a diagram illustrating an example of a memory device 150 included in the memory system 110 in accordance with the present embodiment.

The data processing system 100 may include a host 102 engaged or operably coupled with a memory system 110.

The host 102 may include, for example, any of a variety of portable electronic devices, such as a mobile phone, an MP3 player and a laptop computer, or an electronic device such as a desktop computer, a game player, a television (TV), a projector and the like.

The host 102 also includes at least one operating system (OS), which can generally manage and control, functions and operations performed in the host 102. The OS may provide interoperability between the host 102 engaged with the memory system 110 and the user of the memory system 110. The OS may support functions and operations corresponding to a user's requests. By way of example but not limitation, the OS may include a general operating system and a mobile operating system according to mobility of the host 102. The general operating system may be split into a personal operating system and an enterprise operating system according to system requirements or a user's environment. The personal operating system, including Windows and Chrome, may be subject to support services for general purposes. The enterprise operating systems may be specialized for securing and supporting high performance, including Windows servers, Linux and Unix. Further, the mobile operating system may include an Android, an iOS and a Windows mobile. The mobile operating system may be subject to support services or functions for mobility (e.g., a power saving function). The host 102 may include a plurality of operating systems. The host 102 may execute multiple operating systems in cooperation with the memory system 110, corresponding to a user's request. The host 102 may transmit a plurality of commands corresponding to the user's requests into the memory system 110, thereby performing operations corresponding to commands within the memory system 110.

The memory system 110 may perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card and a memory stick.

The storage devices for the memory system 110 may be implemented with a volatile memory device, for example, a dynamic random access memory (DRAM) or a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) or a flash memory.

Referring to FIGS. 1 and 2, the memory system 110 may include a memory device 150 for storing data accessed by a host 102 and a controller 130 for controlling data storage into the memory device 150.

The memory system 110 may be integrated into a single semiconductor device, which may be included in any of the various types of memory systems as exemplified above.

By way of example but not limitation, the memory system 110 may be integrated into a single semiconductor device. The memory system 110 may be so integrated to form an SSD for improving operation speed. When the memory system 110 is used as an SSD, the operating speed of the host 102 connected to the memory system 110 can be improved compared to when the host 102 is connected to a hard disk. In another embodiment, the memory system 110 may be integrated into one semiconductor device to form a memory card, such as a PC card (PCMCIA), a compact flash card (CF), a smart media card (e.g., SM, SMC), a memory stick, a multimedia card (e.g., MMC, RS-MMC, MMCmicro), a secure digital (SD) card (e.g., SD, miniSD, microSD, SDHC), or a universal flash memory.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

Referring to FIGS. 1 and 2, the memory device 150 in the memory system 110 may be a nonvolatile memory device capable of retaining data stored therein even though no power is supplied, for example, a flash memory device. Therefore, the memory device 150 may store data provided from the host 102 as nonvolatile data therein through a write operation, and provide data stored therein to the host 102 through a read operation.

More specifically, the memory device 150 may include a plurality of memory dies 1500, 1501, 1502, and 1503. Each of the memory dies 1500 to 1503 may include a plurality of planes, such as planes PLANE00 and PLANE01 included in memory die 1500 and planes PLANE10 and PLANE11 included in memory die 1501. Furthermore, each of the planes may include a plurality of memory blocks; for example, plane PLANE00 may include BLOCK000, BLOCK001, and BLOCK002, plane PLANE01 may include BLOCK010, BLOCK011, and BLOCK012, plane PLANE10 may include BLOCK100, BLOCK101, and BLOCK102, and plane PLANE11 may include BLOCK110, BLOCK111, and BLOCK112. In an embodiment, the blocks in a plane may correspond to blocks connected in common to a set of bit lines corresponding to that plane. Furthermore, each of the memory blocks BLOCK000 to BLOCK112 may include a respective plurality of pages P0 to P4. Each of the pages P0 to P4 may include a plurality of memory cells (not illustrated).

For reference, FIG. 1 illustrates that the memory system 110 includes one memory device 150, but embodiments are not limited thereto, and the memory system 110 may include various numbers of memory devices 150, for example, two or four memory devices. Furthermore, FIG. 1 illustrates that one memory device 150 includes four memory dies 1500 to 1503, but embodiments are not limited thereto, and the memory device 150 may include various numbers of memory dies, for example, two or eight memory dies. FIG. 2 illustrates that one memory die includes two planes, but embodiments are not limited thereto, and one memory die may include various numbers of planes, for example, four or eight planes. Furthermore, FIG. 2 illustrates that one plane includes three memory blocks, but embodiments are not limited thereto, and one plane may include various numbers of memory blocks, for example, more than three memory blocks. Furthermore, FIG. 2 illustrates that one memory block includes five pages, but embodiments are not limited thereto, and, one memory block may include various numbers of pages, for example, more than five pages.

The plurality of memory dies 1500 to 1503 included in the memory device 150 may be coupled to the controller 130 through a plurality of channels CH0 to CH3. For example, the zeroth memory die 1500 may be coupled to the controller 130 through the zeroth channel CH0, the first memory die 1501 may be coupled to the controller 130 through the first channel CH1, the second memory die 1502 may be coupled to the controller 130 through the second channel CH2, and the third memory die 1503 may be coupled to the controller 130 through the third channel CH3.

For reference, FIG. 2 illustrates that four memory dies 1500 to 1503 are coupled to the controller 130 through the four channels CH0 to CH3. However, the number of memory dies is not always equal to the number of channels, and in embodiments various numbers of memory dies, for example, two or four memory dies may be coupled to one channel. That is, the numbers of memory dies and channels within the memory device 150 can be changed according to the purpose of use and the performance requirement of the memory system 110.

When each of the memory dies 1500 to 1503 includes the plurality of planes and one memory die is coupled to one channel, each of the planes may be coupled to a channel through a way. Referring to FIG. 2, the two planes PLANE00 and PLANE01 included in the zeroth memory die 1500 may be coupled to the zeroth channel CH0 through a zeroth way WAY0 and a first way WAY1, respectively. Similarly, the two planes PLANE10 and PLANE11 included in the first memory die 1501 may be coupled to the first channel CH1 through a second way WAY2 and a third way WAY3, respectively.

For reference, FIG. 2 illustrates that two ways are coupled to one channel because two planes are included in one memory die. However, embodiments are not limited thereto, and the number of ways coupled to one channel may be determined depending on how many planes are coupled to one channel.

The plurality of memory dies 1500 to 1503 included in the memory device 150 may be considered as modules different from one another, and coupled to the controller 130 through a plurality of data paths such as the plurality of channels CH0 to CH3, which are different from one another. When the plurality of memory dies 1500 to 1503 and the controller 130 exchange data through the plurality of data paths, it may indicate that the data are exchanged between the plurality of memory dies 1500 to 1503 and the controller 130 through an interleaving operation. When data are exchanged through the interleaving operation using the plurality of data paths, a data transfer rate can be higher than when data are exchanged through one data path.

Referring back to FIG. 1, the controller 130 in the memory system 110 controls the memory device 150 in response to a request from the host 102. For example, the controller 130 provides the host 102 with data read from the memory device 150, and stores data provided from the host 102 in the memory device 150. For this operation, the controller 130 controls read, write, program and erase operations of the memory device 150.

The controller 130 may include a host interface (I/F) 132, a processor 134, an ECC (Error Correction Code) 138, a memory interface (I/F) 142 and a memory 144.

The host Interface 132 in the controller 130 may process commands and data provided from the host 102, and may communicate with the host 102 through at least one of various interface protocols, such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (PATA), small computer system interface (SCSI), enhanced small disk interface (ESDI) and integrated drive electronics (IDE). In accordance with an embodiment, the host interface 132 is a component for exchanging data with the host 102, which may be implemented through firmware called a host interface layer (HIL).

The ECC unit 138 may correct error bits of the data to be processed in (e.g., outputted from) the memory device 150, which may include an ECC encoder and an ECC decoder. Here, the ECC encoder may perform error correction encoding of data to be programmed in the memory device 150 to generate encoded data into which a parity bit is added and store the encoded data in the memory device 150. The ECC decoder may detect and correct errors contained in a data read from the memory device 150 when the controller 130 reads the data stored in the memory device 150. In other words, after performing error correction decoding on the data read from the memory device 150, the ECC unit 138 may determine whether the error correction decoding has succeeded and output an instruction signal (e.g., a correction success signal or a correction fail signal). The ECC unit 138 may use the parity bit which is generated during the ECC encoding process, for correcting the error bit of the read data. When the number of error bits is greater than or equal to a threshold number of correctable error bits, the ECC unit 138 may not correct error bits but instead may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), or a Block coded modulation (BCM). The ECC unit 138 may include any and all circuits, modules, systems or devices for performing the error correction operation based on at least one of the above described codes.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface 142 may provide an interface for handling commands and data between the controller 130 and the memory device 150, for example, operations of NAND flash interface, in particular, operations between the controller 130 and the memory device 150. In accordance with an embodiment, the memory interface 142 may be implemented through firmware called a flash interface layer (FIL) as a component for exchanging data with the memory device 150.

The memory 144 may support operations performed by the memory system 110 and the controller 130. The memory 144 may store temporary or transactional data generated or delivered for operations in the memory system 110 and the controller 130. The controller 130 may control the memory device 150 in response to a request from the host 102. The controller 130 may deliver data read from the memory device 150 into the host 102. The controller 130 may store data entered through the host 102 within the memory device 150. The memory 144 may be used to store data required for the controller 130 and the memory device 150 to perform operations such as read operations or program/write operations.

The memory 144 may store data for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memory 144 may include a program memory, a data memory, a write buffer/cache, a read buffer/cache, a data buffer/cache and a map buffer/cache.

The memory 144 may be implemented as a volatile memory. For example, the memory 144 may be implemented as an SRAM (Static Random Access Memory) or DRAM (Dynamic Random Access Memory). Furthermore, as illustrated in FIG. 1, the memory 144 may be present inside or outside the controller 130. When the memory 144 is present outside the controller 130, data may be inputted to/outputted from the controller 130 through a separate memory interface (not illustrated).

The processor 134 may be implemented with a microprocessor or a central processing unit (CPU). The memory system 110 may include one or more processors 134. The processor 134 may control the overall operations of the memory system 110. By way of example but not limitation, the processor 134 can control a program operation or a read operation of the memory device 150, in response to a write request or a read request entered from the host 102. In accordance with an embodiment, the processor 134 may use or execute firmware to control the overall operations of the memory system 110. Herein, the firmware may be a flash translation layer (FTL). The FTL may serve as an interface between the host 102 and the memory device 150. The host 102 may transmit requests for write and read operations to the memory device 150 through the FTL.

The FTL may manage operations of address mapping, garbage collection, wear-leveling and so forth. Particularly, the FTL may load, generate, update, or store map data. Therefore, the controller 130 may map a logical address, which is entered from the host 102, with a physical address of the memory device 150 through the map data. The address mapping operation allows the memory device 150 to function as a general storage device that performs a read or write operation. Using the address mapping operation based on the map data, when the controller 130 is to update data stored in a particular page, the controller 130 may program the updated data on another empty page and may invalidate old data of the particular page (e.g., update a physical address, corresponding to a logical address of the updated data, from the particular page to the newly programed page) as necessitated by a characteristic of a flash memory device. Further, the controller 130 may store map data of the new data into the FTL.

For example, when performing an operation requested from the host 102 in the memory device 150, the controller 130 uses the processor 134. The processor 134 engaged with the memory device 150 may handle instructions or commands corresponding to an inputted command from the host 102. The controller 130 may perform a foreground operation as a command operation, corresponding to an command from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 using the processor 134. By way of example but not limitation, the background operation for the memory device 150 includes copying data in a memory block, from among the plurality of memory blocks BLOCK000 to BLOCK112, and storing such data in another memory block (e.g., a garbage collection (GC) operation). The background operation may include an operation to move data stored in at least one of the plurality of memory blocks BLOCK000 to BLOCK112 in the memory device 150, into at least another of the plurality of memory blocks BLOCK000 to BLOCK112 (e.g., a wear leveling (WL) operation). During a background operation, the controller 130 may use the processor 134 to store the map data stored in the controller 130 to at least one of the plurality of memory blocks BLOCK000 to BLOCK112, e.g., a map flush operation. A bad block management operation of checking for bad blocks among the plurality of memory blocks BLOCK000 to BLOCK112 is another example of a background operation that may be performed by the processor 134.

A management unit (not shown) may be included in the processor 134. The management unit may perform bad block management of the memory device 150. The management unit may find bad memory blocks, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Figure 3:
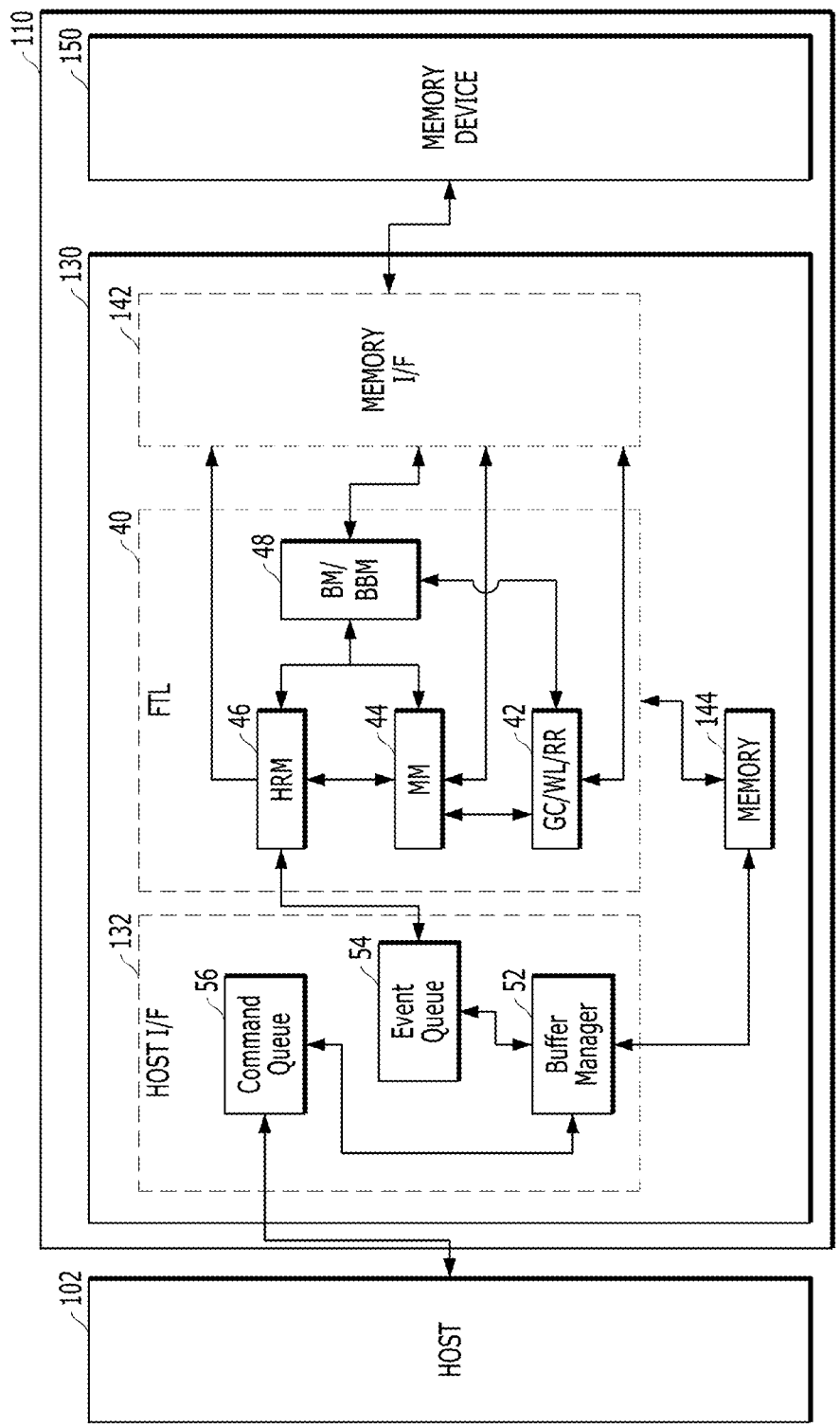
FIG. 3 illustrates a controller within a memory system in accordance with an embodiment.

FIG. 3 is a diagram illustrating a controller 130 within a memory system 110 in accordance with an embodiment.

Referring to FIG. 3, the memory system 110 may include a memory device 150 for storing data accessed by a host 102 and a controller 130 for controlling data storage into the memory device 150. The controller 130 may include a host interface 132, an FTL (Flash Translation Layer) 40, a memory interface 142 and a memory 144.

Although not illustrated in FIG. 3, the ECC 138 described with reference to FIG. 1 may be included in the FTL 40, depending on an embodiment. At this time, depending on an embodiment, the ECC 138 may be implemented as a separate module, circuit, or firmware within the controller 130.

The host interface 132 is for handling commands and data from the host 102. By way of example but not limitation, the host interface 132 may include a command queue 56, a buffer manager 52 and an event queue 54. The command queue 56 may sequentially store commands and data from the host 102 and output the commands and data to the buffer manager 52 in a stored order. The buffer manager 52 may classify, manage or adjust the commands and the data, which are delivered from the command queue 56. The event queue 54 may sequentially transmit events for processing the commands and the data, from the buffer manager 52.

A plurality of commands or data of the same characteristic may be consecutively received from the host 102, or commands and data of different characteristics may be transmitted to the memory system 110 after being mixed or jumbled. For example, a plurality of commands for reading data (i.e., read commands) may be consecutively delivered, or read commands and program/write commands may be alternately transmitted to the memory system 110. The host interface 132 may store commands and data, which are received from the host 102, to the command queue 56 sequentially. Thereafter, the host interface 132 may estimate or predict for each command what type of internal operation(s) the controller 130 will perform according to the characteristics of the command (and any accompanying data) received from the host 102. The host interface 132 may determine a processing order and a priority of commands and data, based at least on their characteristics. According to characteristics of commands and data received from the host 102, the buffer manager 52 in the host interface 132 is configured to determine whether the buffer manager 52 should store commands and data in the memory 144, or whether the buffer manager 52 should deliver the commands and the data into the flash translation layer (FTL) unit 40. The event queue 54 receives events, entered from the buffer manager 52, which are to be internally executed and processed by the memory system 110 or the controller 130 in response to the commands and the data from the host 102, so as to deliver the events into the flash translation layer (FTL) unit 40 in the order received.

In accordance with an embodiment, the flash translation layer (FTL) unit 40 may include a state manager (GC/WL/RR) 42, a map manager (MM) 44, a host request manager (HRM) 46, and a block manager (BM/BBM) 48. The host request manager 46 may manage the events entered from the event queue 54. The map manager 44 may handle or control map data such as logical-to-physical (L2P) address map data. The state manager 42 may perform garbage collection (GC) or wear leveling (WL) or read reclaim (RR). The block manager 48 may execute commands or instructions onto a block in the memory device 150.

By way of example but not limitation, the host request manager 46 may use the map manager 44 and the block manager 48 to handle or process requests according to the read and program commands, and to handle events delivered from the host interface 132. The host request manager 46 may send an inquiry request to the map data manager 44 to determine a physical address corresponding to the logical address which is entered with the events. The host request manager 46 may send a read request with the physical address to the memory interface 142, to process the read request (handle the events). On the other hand, the host request manager 46 may send a program request (or write request) to the block manager 48 to program entered data to an empty page (i.e., a page having no data) in the memory device 150, and then, may transmit a map update request corresponding to the program request to the map manager 44 to update an item relevant to the programmed data in information regarding the mapping of the logical and physical addresses to each other.

Here, the block manager 48 may convert a program request delivered from the host request manager 46, the map data manager 44, and/or the state manager 42 into a flash program request for the memory device 150 to manage flash blocks in the memory device 150. In order to maximize or enhance program or write performance of the memory system 110, the block manager 48 may collect program requests and send flash program requests for multiple-plane and one-shot program operations to the memory interface 142. The block manager 48 may send several flash program requests to the memory interface 142 to enhance or maximize parallel processing of the multi-channel flash controller.

The block manager 48 may be configured to manage blocks in the memory device 150 according to the number of valid pages, select and erase blocks having no valid pages when a free block is needed, and select a block including the least number of valid pages when it is determined that garbage collection is necessary. The state manager 42 may perform garbage collection to move valid data to an empty block and erase the remaining data in the blocks from which the valid data was moved so that the block manager 48 may have enough free blocks (i.e., empty blocks with no data). If the block manager 48 provides information regarding a block to be erased to the state manager 42, the state manager 42 may check all flash pages of the block to be erased to determine whether each page is valid. For example, to determine validity of each page, the state manager 42 may identify a logical address stored in an out-of-band (OOB) area of each page. To determine whether each page is valid, the state manager 42 may compare the physical address of the page with the physical address mapped to the logical address obtained from the request. The state manager 42 sends a program request to the block manager 48 for each valid page. A mapping table may be updated through the update of the map manager 44 when the program operation is complete.

The map manager 44 may manage a logical-to-physical mapping table. The map manager 44 may process requests such as queries and updates, which are generated by the host request manager 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant portion of the mapping table stored in the memory device 150. When the number of dirty cache blocks in the map manager 44 exceeds a certain threshold, a program request may be sent to the block manager 48 so that a clean cache block is made and the dirty is map table may be stored in the memory device 150.

When garbage collection is performed, the state manager 42 copies valid page(s) into a free block, and the host request manager 46 may program the latest version of the data for the same logical address of the page and currently issue an update request. When the state manager 42 requests the map update in a state in which copying of valid page(s) has not been completed, the map manager 44 may not perform the mapping table update. This is because the map request is issued with old physical information if the state manger 42 requests a map update and a valid page copy is not completed until later. To ensure accuracy, the map manager 44 may perform a map update operation only if the latest map table still points to the old physical address.

The read or write command transferred from the FTL 40 to the memory interface 142 may be a command for the minimum read unit or the minimum write unit which can be performed in the memory device 150. At this time, the minimum read unit or the minimum write unit may indicate a minimum size of data which can be read from or written to the memory device 150 through one read or write operation. Therefore, the minimum read unit or the minimum write unit may have a different value depending on the type of the memory device 150. For example, when the memory device 150 is an NAND flash memory device, the minimum read unit or minimum write unit may correspond to a page.

The memory device 150 may include a plurality of memory blocks. Each of the plurality of memory blocks may be a single level cell (SLC) memory block or a multi-level cell (MLC) memory block, according to the number of bits that can be stored or represented in one memory cell of such block. Here, the SLC memory block includes a plurality of pages implemented by memory cells, each storing one bit of data. The SLC memory block can have high data I/O operation performance and high durability. The MLC memory block includes a plurality of pages implemented by memory cells, each memory cell storing multi-bit data (e.g., two bits or more). The MLC memory block can have a larger storage capacity for the same space compared to the SLC memory block. The MLC memory block can be highly integrated in terms of storage capacity. In an embodiment, the memory device 150 may be implemented with MLC memory blocks, such as a double level cell memory block, a triple level cell (TLC) memory block, a quadruple level cell (QLC) memory block, or a combination thereof. The double level memory block may include a plurality of pages implemented by memory cells each capable of storing 2-bit data. The triple level cell (TLC) memory block may include a plurality of pages implemented by memory cells each capable of storing 3-bit data. The quadruple level cell (QLC) memory block may include a plurality of pages implemented by memory cells each capable of storing 4-bit data. In another embodiment, the memory device 150 may be implemented with a block including a plurality of pages implemented by memory cells each capable of storing 5-bit or more bit data.

In an embodiment of the disclosure, the memory device 150 is embodied as a nonvolatile memory such as a flash memory such as a NAND flash memory, a NOR flash memory and the like. In another embodiment, the memory device 150 may be implemented by at least one of a phase change random access memory (PCRAM), a ferroelectrics random access memory (FRAM) and a spin injection magnetic memory (e.g., a spin transfer torque magnetic random access memory (STT-MRAM)).

Figure 4:
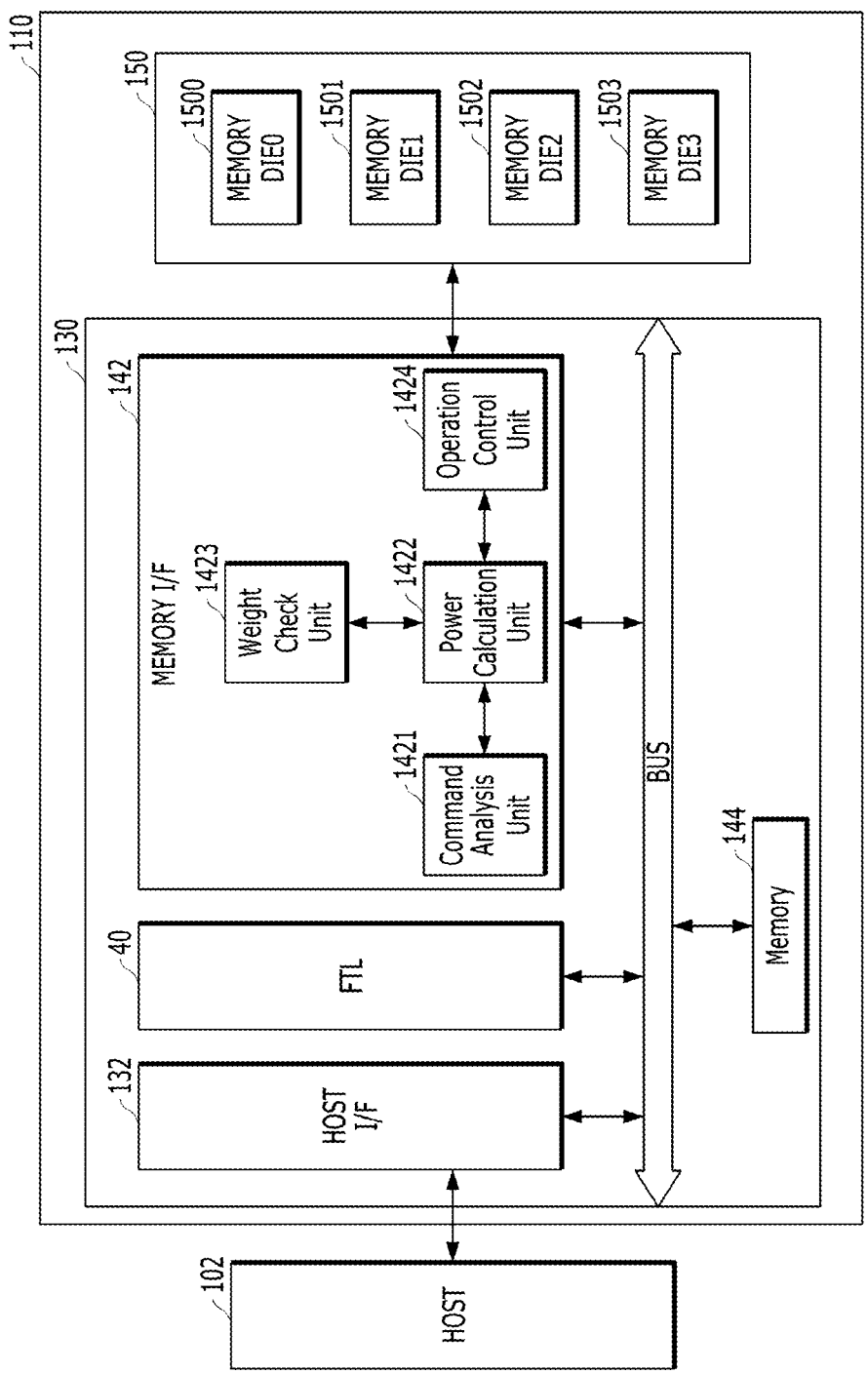
FIG. 4 illustrates a memory interface (I/F) included in a controller within a memory system in accordance with an embodiment.

FIG. 4 is a diagram illustrating a memory interface included in a controller within a memory system in accordance with an embodiment.

Referring to FIG. 4, the memory system 110 may include a memory device 150 for storing data accessed by a host 102 and a controller 130 for controlling data storage into the memory device 150, like the memory system 110 described with reference to FIG. 3. The controller 130 may include a host interface 132, an FTL 40, a memory interface 142 and a memory 44, like the controller 130 described with reference to FIG. 3. The memory device 150 may include a plurality of memory dies, like the plurality of memory dies 1500 to 1503 described with reference to FIGS. 1 and 2. The memory interface 142 may include a command analysis unit 1421, a power calculation unit 1422, a weight check unit 1423 and an operation control unit 1424. When the memory interface 142 is implemented using a FIL, the command analysis unit 1421, power calculation unit 1422, weight check unit 1423, and operation control unit 1424 may be respectively implemented by a processor executing respective portions of the FIL.

For reference, the descriptions of most of the components 132, 40, 144 and 150 included in the memory system 110 which will be described with reference to FIG. 4 are already included in the above descriptions with reference to FIGS. 1 to 3. Therefore, the following descriptions with reference to FIG. 4 will be focused on the operation of the memory interface 142 which is not described in detail with reference to FIGS. 1 to 3.

Referring to FIG. 4, when first and second commands that both operate on a same memory die selected from among the plurality of memory dies 1500 to 1503 are sequentially received by the controller 130, the controller 130 may analyze the first and second commands and identify a first operation of the first command and a second operation of the second command, which cannot be performed in operation sections overlapping each other. In other words, when the first operation of the first command and the second operation of the second command are to be performed in the selected memory die, the controller 130 may identify in advance the operation section of the first operation of the first command and the operation section of the second operation of the second command which cannot overlap each other before the first and second operations are performed in the selected memory die.

The controller 130 may also identify a third operation of the first command which can be performed in an operation section overlapping that of the second operation of the second command, and identify a fourth operation of the second command which can be performed in an operation section overlapping that of the first operation of the first command.

In other words, when the second operation of the second command and the third operation of the first command are to be performed in the selected memory die, the controller 130 may identify, before the third and second operations are performed in the selected memory die, the operation section of the third operation of the first command and the operation section of the second operation of the second command which can overlap each other. Similarly, when the first operation of the first command and the fourth operation of the second command are to be performed in the selected memory die, the controller 130 may identify, before the first and fourth operations are performed in the selected memory die, the operation section of the first operation of the first command and the operation section of the fourth operation of the second command which can overlap each other.

In this example, since the first and third operations included in the first command are operations included in one command, the first and third operations cannot be performed while overlapping each other. Similarly, since the second and fourth operations included in the second command are also operations included in one command, the second and fourth operations cannot be performed while overlapping each other, either.

As described above, when two different commands are sequentially performed in one memory die selected among the plurality of memory dies 1500 to 1503, the commands can be performed while (at least partially) overlapping each other or cannot be performed while overlapping each other. That is because a command operation performed in one memory die in response to one command may in reality include a plurality of sub operations. Some of a plurality of specific sub operations included in a specific command operation corresponding to one specific command cannot be performed while overlapping sub operations included in another command operation, but the other specific sub operations can be performed while overlapping sub operations included in the another command operation.

For example, as described with reference to FIG. 3, even when a read or write command transferred to the memory interface 142 from the FTL 40 in the controller 130 may be a command for the minimum read unit or the minimum write unit which can be performed in the memory device 150, a read operation or write operation performed in the memory device 150 in response to the read or write command may include a plurality of sub operations.

For example, a read operation, which is performed in any one memory die included in the memory device 150 when the controller 130 transfers one read command to the memory die, may include a first sub operation and a second sub operation. The first sub operation may include physically reading data from a memory cell corresponding to an address included in the read command and storing the read data in a specific buffer within the memory die, for example, a page buffer included in each of the plurality of memory blocks included in the memory die, and the second sub operation may include outputting the read data, stored in the specific buffer within the memory die as the result of the first sub operation, to the controller 130 through a data transfer path, for example, a channel coupled to the memory die. As such, when the read operation corresponding to the read command is divided into two sub operations, a plurality of blocks included in the memory die may perform the first sub operation in parallel to one another. Therefore, the plurality of first sub operations corresponding to a plurality of read commands can be performed while overlapping one another. However, the second sub operations cannot be simultaneously performed through one channel serving as a data transfer path between the memory die and the controller 130. Therefore, the plurality of second sub operations corresponding to a plurality of read commands cannot be performed while overlapping one another (but may be able to be performed while overlapping, for example, first sub operations of different read commands).

For another example, a write operation, which is performed in any memory die included in the memory device 150 when the controller 130 transfers one write command to the memory die, may include a first sub operation and a second sub operation. The first sub operation may include storing write data, inputted from the controller 130 through the data transfer path, for example, a channel coupled to the memory die with a write command, in a specific buffer within the memory die, for example, a page buffer included in each of the plurality of blocks included in the memory die, and the second sub operation may include physically writing the write data, stored in the specific buffer within the memory die as the result of the first sub operation, to a memory cell corresponding to an address included in the write command. As such, when the write operation corresponding to the write command is divided into two sub operations, the first sub operations cannot be simultaneously performed through the channel serving as the data transfer path between the memory die and the controller 130. Therefore, the plurality of first sub operations corresponding to a plurality of write commands cannot be performed while overlapping one another. However, the plurality of blocks included in the memory die can perform the second sub operations in parallel to one another. Therefore, the plurality of second sub operations corresponding to a plurality of write commands can be performed while overlapping one another (and may be able to be performed while overlapping, for example, first sub operations of different write commands).

For reference, the above-described configuration in which two sub operations are included in a read operation and two sub operations are included in a write operation is only an embodiment. In reality, each of the read and write operations may include a larger number of sub operations.

In embodiments, the controller 130 is configured to accurately predict the total power and peak power which will be used when a selected memory die performs operations corresponding to a plurality of consecutive commands (such as the first and second commands described above) by calculating the total power and peak power before transmitting operations corresponding to the plurality of consecutive commands to the selected memory die.

Embodiments result in a smaller difference between the total power and peak power which are calculated and predicted by the controller 130 and the total power and peak power which are actually used in the selected memory die, which enables the memory system 110 including the selected memory die to operate more efficiently.

That is, in order to stably and rapidly process a plurality of commands stored in an internal command queue, the controller 130 needs to schedule the plurality of commands before they are processed. Specifically, the controller 130 needs to determine which command to transfer to a certain memory die among the plurality of memory dies 1500 to 1503 included in the memory device 150 at a certain time point. In embodiments, the controller 130 may schedule the order in which the plurality of commands are performed and the time points that the plurality of commands are performed based on the total power and peak power which are previously calculated and predicted under the supposition that the plurality of commands are performed according to the scheduled order. When the total power and peak power, which are previously calculated and predicted under the supposition that the plurality of commands are performed according to the scheduled order, have significant differences from the total power and peak power which are used when the plurality of commands are actually performed in the plurality of memory dies according to the scheduled order, the performance of the memory system 110 may be degraded by, for example, exceeding a peak power limit as a result of underestimating the peak power and therefore causing thermal throttling or a shutdown of the memory device, or by failing to schedule as many commands for simultaneous performance as possible as a result of overestimating the total power and/or peak power and therefore not taking advantage of efficiencies obtainable by simultaneously performing commands.

In particular, when two or more commands are sequentially performed in any one memory die among the plurality of memory dies 1500 to 1503, for example, when the first and second commands are sequentially performed in the selected memory die as described above, the magnitudes of the total power and peak power predicted by simply adding the power required for performing the first command and the power required for performing the second command may be much larger than the magnitudes of the total power and peak power which are used when the first and second commands are actually performed in the selected memory device. That is because a command operation performed in one memory die in response to one command may include a plurality of sub operations, and depending on the types of the first and second commands, sub operations included therein and overlap operation sections thereof may be significantly different from each other. Thus, power used for the first and second commands when executed together may be significantly different from the power predicted by simply summing the power of the commands when executed separately.

Therefore, in order to accurately predict in advance the total power and peak power which will be used when operations corresponding to the first and second commands are performed in a selected memory die, before transferring the first and second commands to the selected memory die, the controller 130 may operate as illustrated in the following example.

First, when first and second commands are to be sequentially transferred to a selected memory die among the plurality of memory dies 1500 to 1503 as described above, the controller 130 may identify first and third operations included in the first command and second and fourth operations included in the second command. In this example, the operation sections (that is, the time periods during which the operations are respectively performed) of the first operation of the first command and the second operation of the second command cannot overlap each other, the operation sections of the third operation of the first command and the second operation of the second command can overlap each other, and the operation sections of the first operation of the first command and the fourth operation of the second command can overlap each other. Furthermore, the operation sections of the first and third operations included in the first command cannot overlap each other, and the operation sections of the second and fourth operations included in the second command cannot overlap each other.

The controller 130 may calculate single power which is expected to be used in a single operation section in which only any one of the first to fourth operations included in each of the first and second commands can be performed. Furthermore, the controller 130 may calculate peak power which is expected to be used in an overlap operation section in which two or more operations of the first to fourth operations can be performed while overlapping each other. Furthermore, the controller 130 may calculate total power which is expected to be used when the first and second commands are performed in the selected memory die, by adding the single power and the peak power according to the operation time points of the first to fourth operations. At this time, the controller 130 may adjust the operation time points (for example, start times) of the first to fourth operations such that the total power is minimized while the peak power is kept at a value smaller than a predetermined reference value (such as a peak power limit). For example, in an embodiment wherein overlapped operations use the same or less total power than would be used when the operations are performed without overlapping, the controller 130 may adjust the operation time points to overlap as many operations as possible without the peak power exceeding the predetermined reference value.

The controller 130 may adjust the method for calculating the peak power according to the types of the first and second commands and the type of the selected memory die. That is, the controller 130 may calculate operation currents by applying 'preset weights' to two or more currents corresponding to two or more operations which are performed while overlapping each other in an overlap operation section, and then calculate the peak power by predicting the operation currents will be used in the overlap operation section and using the operation predicted currents to predict the peak power used in the overlap operation section. In embodiments, the values of the 'preset weights' may be determined according to the types of the first and second commands and the type of the selected memory die.

For example, when the selected memory die is a NAND flash memory die, the first and second commands are read commands, and the operation section of the first operation included in the first command and the operation section of the fourth operation included in the second command partially overlap each other to cause an overlap operation section, the controller 130 may apply a weight of '1' to a current corresponding to the first operation included in the first command, and apply a weight of 0.5 to a current corresponding to the fourth operation included in the second command, in the overlap operation section. The weight applied to the current corresponding to the fourth operation may be less than one when, for example, operation currents consumed by support circuity in the memory die do not increase when a number of operations are performed simultaneously, or do not increase in proportion to the number of operations being performed simultaneously.

For another example, when the selected memory die is a NAND flash memory die, the first and second commands are write commands, and the operation section of the third operation included in the first command and the operation section of the second operation included in the second command partially overlap each other to cause an overlap operation section, the controller 130 may apply a weight of '1' to a current corresponding to the third operation included in the first command, and apply a weight of '1' even to a current corresponding to the second operation included in the second command, in the overlap operation section.

The values of 'preset weights' may be previously determined in the form of information stored in a specific location within the controller 130. That is, the values of 'preset weights' corresponding to the types of the first and second commands and the type of the selected memory die may be directly loaded from the specific space within the controller 130. For example, the specific space within the controller 130 may indicate a location in which firmware is stored. When the firmware is loaded during a process of booting the memory system 110, the values of 'preset weights' may be loaded together.

For reference, 'power' may be calculated by multiplying 'voltage', 'current' and 'time'. Furthermore, it has been assumed that the first to fourth operations included in the first and second commands are all performed in the selected memory die which is physically one device. In the examples provided, it may be assumed that a supply voltage supplied to the selected memory die is not varied but retains a constant level at least while the first and second commands are performed in the selected memory die. Therefore, it may be considered that 'voltage' used as a variable for calculating 'power' is always constant. Furthermore, 'time' used as a variable for calculating the 'power' may indicate the length of an operation section. In an embodiment, total power may correspond to the integral of power used over the time required to perform one or more commands (that is, the amount of energy used to perform the commands) and may be expressed in joules, while peak power may correspond to a maximum of the total amount of power being consumed at any time during the performing of the commands, and may be expressed in watts.

Furthermore, when the first and second commands are referred to herein as being "sequentially transferred" to the selected memory die, this may indicate that a difference between the time point that the first command is transmitted to the selected memory die and the time point that the second command is transmitted to the selected memory die is larger than a minimum time interval and smaller than a maximum time interval. That is, because the selected memory die is physically one memory die, two different commands, i.e. the first and second commands, cannot be transferred to the selected memory die at the same time point, and from this the minimum time interval may be determined. Furthermore, when the second command is transferred to the selected memory die at or after the time point that the operation of the first command is almost completed after the first command is transferred to the selected memory die, no opportunity to schedule operations of the first and second commands to overlap may be provided, and therefore the first and second commands may not be considered to be sequentially transferred to the selected memory die. Thus, the maximum time interval may be determined.

More specifically, the command analysis unit 1421 included in the memory interface 142 included in the controller 130 may analyze commands transferred from the FTL 40, and identify one or more operations included in each command. That is, the command analysis unit 1421 may select first and second commands which are supposed to be sequentially transferred to the selected memory die from among a plurality of commands transferred from the FTL 40, and may then analyze the selected first and second commands and identify, for example, the first to fourth operations. In an example, the operation sections of the first operation of the first command and the second operation of the second command, identified by the command analysis unit 1421, cannot overlap each other, the operation sections of the third operation of the first command and the second operation of the second command can overlap each other, and the operation sections of the first operation of the first command and the fourth operation of the second command can overlap each other, and furthermore, the operation sections of the first and third operations included in the first command cannot overlap each other, and the operation sections of the second and fourth operations included in the second command cannot overlap each other. Although the example here describes the command analysis unit 1421 as identifying two operations in each analyzed commands, embodiments are not limited thereto. In embodiments, the command analysis unit 1421 may identify on or more operations for each command, and the number of operations identified for each command may vary according to the type of the command and the data associated with the command.

The power calculation unit 1422 included in the memory interface 142 may calculate single power, peak power and total power according to the operation time points of the first to fourth operations which the command analysis unit 1421 identified by analyzing the first and second commands. That is, the power calculation unit 1422 may calculate single power which is expected to be used in a single operation section in which only any one of the first to fourth operations can be performed. Furthermore, the power calculation unit 1422 may calculate peak power which is expected to be used in an overlap operation section in which two or more operations of the first to fourth operations can be performed while overlapping each other. Furthermore, the power calculation unit 1422 may calculate the total power which is expected to be used when the first and second commands are performed in the selected memory die, by integrating the single power(s) and the peak power(s) according to the operation time points of the first to fourth operations. For example, for each operation section, the power calculation unit 1422 may determine an operation current of each of the operations sections, and determine the total power as equal to $\Sigma(I_i \cdot V_i \cdot T_i)$ for i=1 . . . n, where n is the number of operation sections, $I_i$ is the operation current during operation section i, $V_i$ is a supply voltage during the operation section i (which in embodiments may be the same for every operation section), and $T_i$ is a duration of the operation section i. However, embodiments are not limited thereto.

The power calculation unit 1422 may adjust the method for calculating the peak power according to the types of the first and second commands and the type of the selected memory die. That is, the controller 130 may calculate operation currents by applying 'preset weights' to two or more currents corresponding to two or more operations which are performed while overlapping each other in an overlap operation section, among the first to fourth operations included in the first and second commands, and then calculate the peak power by predicting that the operation currents will be used in the overlap operation section. At this time, the values of 'preset weights' may be decided by referring to weight information transferred by the weight check unit 1423.

The operation control unit 1424 included in the memory interface 142 may check the result of the power calculation unit 1422, and adjust the operation time points of the first to fourth operations according to the check result. That is, the operation control unit 1424 may check the result of the power calculation unit 1422, and adjust the operation time points of the first to fourth operations included in the first and second commands according to the check result, such that the total power is minimized in a state where the peak power is retained at a value smaller than the predetermined reference value while the first and second commands are performed in the selected memory die. For example, the operation control unit 1424 may check a peak power determined by the power calculation unit of the power calculation unit 1422 according to a first set of operation time points, may determine whether the peak power exceeds a reference value, and in response to the peak power exceeding the reference value may cause the first set of operation time points to be modified to produce a second set of operation time points which may then be used by the power calculation unit 1422 to produce new peak power and total power results, at which point the process described above may repeat.

The weight check unit 1423 may check the types of the first and second commands and the type of the selected memory die, and transfer weight information corresponding to the check result to the power calculation unit 1422. For example, when it is checked that the selected memory die is a NAND flash memory die and the first and second commands are read commands, the weight check unit 1423 may transfer weight information to the power calculation unit 1422, the weight information indicating that a weight of '1' needs to be applied to a current corresponding to the first operation included in the first command and a weight of '0.5' needs to be applied to a current corresponding to the fourth operation included in the second command, in an overlap operation section in which the first operation and the fourth operation each other.

Figure 5:
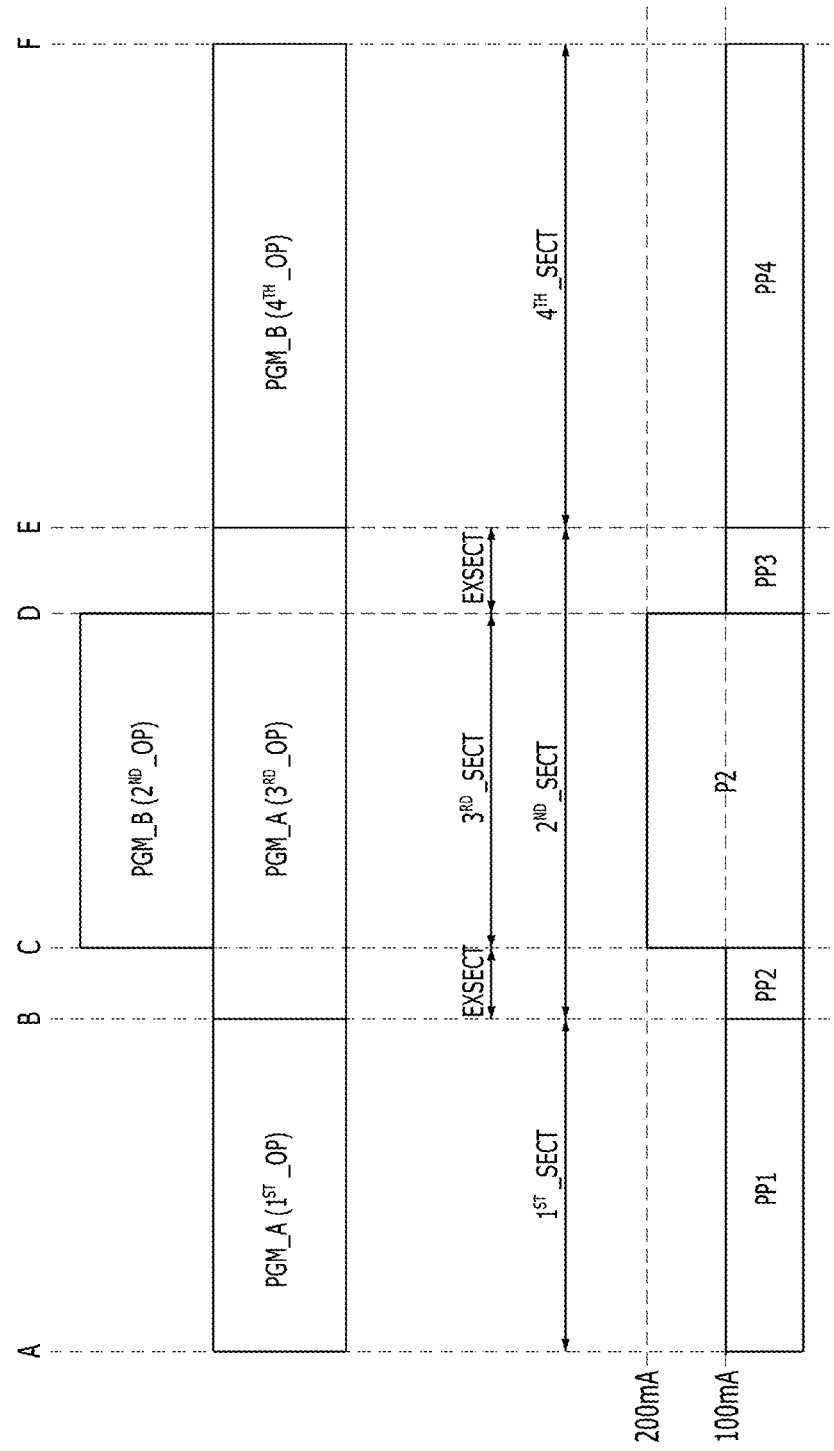
FIG. 5 illustrates a first operation of the controller according to an embodiment on a plurality of sequential commands.

FIG. 5 is a diagram for describing a first operation of the controller on a plurality of sequential commands.

FIG. 5 illustrates an operation in which, when sequentially transferring first and second commands to a selected memory die among the plurality of memory dies 1500 to 1503, the controller 130 calculates single power P1, overlap power P2, peak power (not shown), and total power TOTAL_PW as described with reference to FIGS. 1 to 4, in the case that the first command is a first write command PGM_A for storing first data in the selected memory die and the second command is a second write command PGM_B for storing second data in the selected memory die.

Specifically, it may be assumed that the controller 130 will start a write operation at a time point A in response to the first write command PGM_A, and will start a write operation at a time point C in response to the second write command PGM_B. That is, the controller 130 will transfer the first write command PGM_A to the selected memory die, and then transfer the second write command PGM_B to the selected memory die.

In this example, the first write command PGM_A may include a first operation 1ST_OP in which the controller 130 transfers the first data to the selected memory die and a third operation 3RD_OP in which the selected memory die physically stores the first data therein. Accordingly, the controller 130 may analyze the first write command PGM_A and identify the first operation 1ST_OP and the third operation 3RD_OP as being included in the write command PGM_A.

The controller 130 may analyze the first write command PGM_A and determine that the first operation 1ST_OP and the third operation 3RD_OP need to be sequentially performed in such manner that the operation sections thereof do not overlap each other. At this time, the controller 130 may predict that the first operation 1ST_OP of the first write command PGM_A will be performed in a first section 1ST_SECT, i.e. a section between the time points A and B. Furthermore, the controller 130 may predict that the third operation 3RD_OP of the first write command PGM_A will be performed in a second section 2ND_SECT after the first section 1ST_SECT, i.e. a section between time points B and E.

The second write command PGM_B may include a second operation 2ND_OP in which the controller 130 transfers the second data to the selected memory die and a fourth operation 4TH_OP in which the selected memory die physically stores the second data therein. Accordingly, the controller 130 may analyze the second write command PGM_B and identify the second operation 2ND_OP and the fourth operation 4TH_OP as being included in the second write command PGM_B.

The controller 130 may analyze the second write command PGM_B and determine that the second operation 2ND_OP and the fourth operation 4TH_OP need to be sequentially performed in such manner that the operation sections thereof do not overlap each other. Also, the controller 130 may determine that the second operation 2ND_OP needs to be performed while not overlapping the first operation 1ST_OP, after the end point of the first operation 1ST_OP. Also, the controller 130 may determine that the second operation 2ND_OP may be performed while overlapping the third operation 3RD_OP, after the end point of the first operation 1ST_OP. Since the third operation 3RD_OP is included in the first write command PGM_A and the fourth operation 4TH_OP is included in the second write command PGM_B, i.e. two write commands which are sequentially performed in one memory die, the controller 130 may determine that the third operation 3RD_OP and the fourth operation 4TH_OP need to be performed in such manner that the operation sections thereof do not overlap each other. Therefore, the controller 130 may predict that the second operation 2ND_OP of the second write command PGM_B will be performed in a third section 3RD_SECT overlapping the second section 2ND_SECT after the first section 1ST_SECT, i.e. a section between time points C and D, and may predict that the fourth operation 4TH_OP of the second write command PGM_B will be performed in a fourth section 4TH_SECT after the second and third sections 2ND_SECT and 3RD_SECT, i.e. a section between time points E and F.

As described above, the controller 130 may identify the first to fourth operations 1ST_OP, 2ND_OP, 3RD_OP and 4TH_OP included in the first and second write commands PGM_A and PGM_B which are supposed to be sequentially transferred to the selected memory die. Furthermore, the controller 130 may predict the operation sections corresponding the first to fourth operations 1ST_OP, 2ND_OP, 3RD_OP and 4TH_OP included in the first and second write commands PGM_A and PGM_B, i.e. the first to fourth sections 1ST_SECT, 2ND_SECT, 3RD_SECT and 4TH_SECT.

Therefore, the controller 130 may identify one or more single operation sections in which only a respective one of the first to fourth operations 1ST_OP, 2ND_OP, 3RD_OP and 4TH_OP is performed, and calculate the single power P1. Furthermore, the controller 130 may identify one or more overlap operation sections in which a respective two or more operations of the first to fourth operations 1ST_OP, 2ND_OP, 3RD_OP and 4TH_OP are performed while overlapping each other, and calculate the overlap power P2. The controller 130 may determine the total power TOTAL_PW as the sum of the single power P1 and the overlap power P2, and may determine the peak power as being the maximum of the respective instantaneous powers of all the operation sections.

Specifically, since the controller 130 has predicted that only the first operation 1ST_OP will be performed in the first section 1ST_SECT, the controller 130 may calculate first partial power PP1 by predicting that a first current of 100 mA corresponding to the first operation 1ST_OP will be used in the first section 1ST_SECT. Furthermore, since the controller 130 has predicted that the second section 2ND_SECT has partial sections EXSECT which do not overlap the third section 3RD_SECT and only the third operation 3RD_OP will be performed in the partial sections EXSECT, the controller 130 may calculate second partial powers PP2 and PP3 by predicting that a third current of 100 mA corresponding to the third operation 3RD_OP will be used in each of the partial sections EXSECT. Furthermore, since the controller 130 has predicted that only the fourth operation 4TH_OP will be performed in the fourth section 4TH_SECT, the controller 130 may calculate third partial power PP4 by predicting that a fourth current of 100 mA corresponding to the fourth operation 4TH_OP will be used in the fourth section 4TH_SECT. The controller 130 may then calculate the single power P1, which is expected to be used in the single operation sections, by adding up the first partial power PP1, the second partial powers PP2 and PP3 and the third partial power PP4.

Since the controller 130 has predicted that the third section 3RD_SECT overlaps the second section 2ND_SECT and the second and third operations 2ND_OP and 3RD_OP will be performed while overlapping each other in the third section 3RD_SECT, the controller 130 may calculate a first operation current of 200 mA by performing an operation on the third current of 100 mA corresponding to the third operation 3RD_OP and the second current of 100 mA corresponding to the second operation 2ND_OP, and calculate the overlap power P2 which is expected to be used in the overlap operation section, by predicting that the first operation current of 200 mA will be used in the third section 3RD_SECT. The controller 130 may calculate the first operation current of 200 mA by adding a current of 100 mA, obtained by multiplying a first weight of '1' by the second current of 100 mA, and a current of 100 mA, obtained by multiplying a second weight of '1' by the third current of 100 mA. The reason why the controller 130 decides the first weight as '1' and decides the second weight as '1' is because it has been assumed that the selected memory die is a NAND flash memory die, the second operation 2ND_OP is included in the second write command PGM_B, and the third operation 3RD_OP is included in the first write command PGM_A.

The controller 130 may calculate the total power TOTAL_PW which is predicted to be used in order to perform the first and second write commands PGM_A and PGM_B in the selected memory die, by adding the single power P1 and the overlap power P2. The controller 130 may calculate a peak power as the maximum instantaneous power that occurs during any of the sections.

Figure 6:
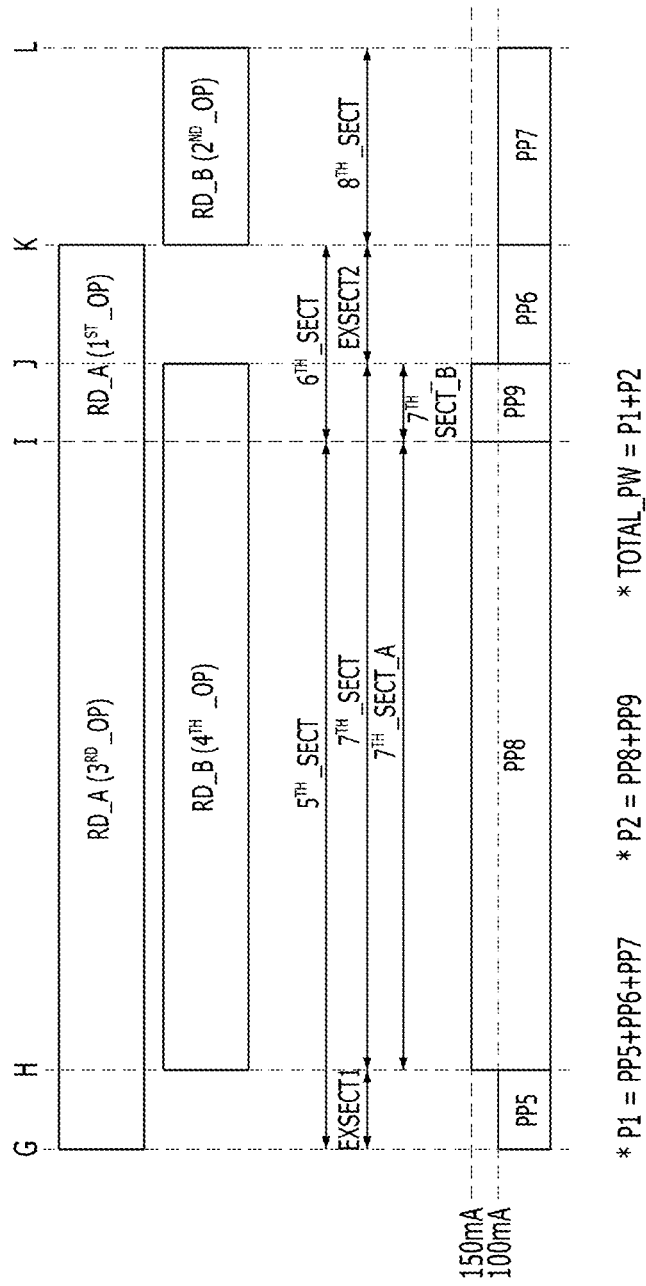
FIG. 6 illustrates a second operation of the controller according to an embodiment on a plurality of sequential commands.

FIG. 6 is a diagram for describing a second operation of the controller on a plurality of sequential commands.

FIG. 6 illustrates an operation in which, when sequentially transferring first and second commands to a selected memory die among the plurality of memory dies 1500 to 1503, the controller 130 calculates single power P1, overlap power P2, peak power (not shown) and total power TOTAL_PW as described with reference to FIGS. 1 to 4 in the case that the first command is a first read command RD_A for reading third data from the selected memory die and the second command is a second read command RD_B for reading fourth data from the selected memory die.

Specifically, it may be assumed that the controller 130 will start a read operation at a time point G in response to the first read command RD_A, and will start a read operation at a time point H in response to the second read command RD_B. That is, the controller 130 may transfer the first read command RD_A to the selected memory die, and then transfer the second read command RD_B to the selected memory die.

The first read command RD_A may include a third operation 3RD_OP in which the selected memory die physically reads the third data therein and a first operation 1ST_OP in which the selected memory die transfers the third data to the controller 130. Accordingly, the controller 130 may analyze the first read command RD_A and identify the first operation 1ST_OP and the third operation 3RD_OP.

The controller 130 may analyze the first read command RD_A and determine that the third operation 3RD_OP and the first operation 1ST_OP need to be sequentially performed while the operation sections thereof do not overlap each other. At this time, the controller 130 may predict that the third operation 3RD_OP of the first read command RD_A will be performed during a fifth section 5TH_SECT, i.e. a section between the time points G and I. Furthermore, the controller 130 may predict that the first operation 1ST_OP of the first read command RD_A will be performed during a sixth section 6TH_SECT after the fifth section 5TH_SECT, i.e. a section between time points I and K.

The second read command RD_B may include a fourth operation 4TH_OP in which the selected memory die physically reads fourth data therein and a second operation 2ND_OP in which the selected memory die transfers the fourth data to the controller 130. Accordingly, the controller 130 may analyze the second read command RD_B and identify the second operation 2ND_OP and the fourth operation 4TH_OP.

The controller 130 may analyze the second read command RD_B and determine that the fourth operation 4TH_OP and the second operation 2ND_OP need to be sequentially performed while the operation sections thereof do not overlap each other. Furthermore, since the third operation 3RD_OP is included in the first read command RD_A and the fourth operation 4TH_OP is included in the second read command RD_B, and the two read commands are sequentially performed in one memory die, the controller 130 may determine that the third operation 3RD_OP and the fourth operation 4TH_OP can be performed while overlapping each other. Therefore, the controller 130 may determine that the fourth operation 4TH_OP can be performed while the operation section thereof overlaps that of the third operation 3RD_OP, after the start point of the third operation 3RD_OP. Furthermore, the controller 130 may determine that the fourth operation 4TH_OP can be performed while the operation section thereof overlaps that of the first operation 1ST_OP which is started after the end point of the third operation 3RD_OP. That is, the controller 130 may determine that the fourth operation 4TH_OP can be performed while the operation section thereof overlaps that of either the third operation 3RD_OP or the first operation 1ST_OP (or both). Furthermore, the controller 130 may determine that the second operation 2ND_OP needs to be performed while the operation section thereof does not overlap that of the first operation 1ST_OP, after the end point of the first operation 1ST_OP. Therefore, the controller 130 may predict that the fourth operation 4TH_OP of the second read command RD_B will be performed during a seventh section 7TH_SECT overlapping at least one of the fifth and sixth sections 5TH_SECT and 6TH_SECT, i.e. a section between time points H and J. For reference, FIG. 6 illustrates that the seventh section 7TH_SECT overlaps both of the fifth and sixth sections 5TH_SECT and 6TH_SECT, but embodiment are not limited thereto. In another embodiment, the seventh section 7TH_SECT may overlap only one of the fifth and sixth sections 5TH_SECT and 6TH_SECT. The controller 130 may predict that the second operation 2ND_OP of the second read command RD_B will be performed during an eighth section 8TH_SECT after the sixth and seventh sections 6TH_SECT and 7TH_SECT, i.e. a section between time points K and L.

As described above, the controller 130 may identify the first, second, third, and fourth operations 1ST_OP, 2ND_OP, 3RD_OP and 4TH_OP included in the first and second read commands RD_A and RD_B which may be sequentially transferred to the selected memory die. Furthermore, the controller 130 may predict the operation sections of the first to fourth operations 1ST_OP, 2ND_OP, 3RD_OP and 4TH_OP, i.e. the fifth, sixth, seventh, and eighth sections 5TH_SECT, 6TH_SECT, 7TH_SECT and 8TH_SECT.

Therefore, the controller 130 may identify one or more single operation sections in which only any one operation of the first to fourth operations 1ST_OP, 2ND_OP, 3RD_OP and 4TH_OP is respectively performed and calculate single power P1 accordingly, and may identify one or more overlap operation section in which respective two or more operations thereof are performed while overlapping each other, and calculate overlap power P2 accordingly.

Specifically, since the controller 130 has predicted that the fifth section 5TH_SECT has a first partial section EXSECT1 which does not overlap the seventh section 7TH_SECT and only the third operation 3RD_OP will be performed in the first partial section EXSECT1, the controller 130 may calculate fourth partial power PP5 by predicting that a third current of 100 mA corresponding to the third operation 3RD_OP will be used in the first partial section EXSECT1. Furthermore, since the controller 130 has predicted that the sixth section 6TH_SECT has a second partial section EXSECT2 which does not overlap the seventh section 7TH_SECT and only the third operation 3RD_OP will be performed in the second partial section EXSECT2, the controller 130 may calculate fifth partial power PP6 by predicting that the first current of 100 mA corresponding to the first operation 1ST_OP will be used in the second partial section EXSECT2. Furthermore, since the controller 130 has predicted that only the second operation 2ND_OP will be performed in the eighth section 8TH_SECT, the controller 130 may calculate sixth partial power PP7 by predicting that a second current of 100 mA corresponding to the second operation 2ND_OP will be used in the eighth section 8TH_SECT. Then, the controller 130 may calculate the single power P1, which is expected to be used in the single operation sections, by adding the fourth partial power PP5, the fifth partial power PP6 and the sixth partial power PP7.

Since the controller 130 has predicted that the third and fourth operations 3RD_OP and 4TH_OP will be performed while overlapping each other in the portion of seventh section 7TH_SECT that overlaps the fifth section 5TH_SECT, i.e. in a part 7TH_SECT_A of the seventh section 7TH_SECT, the controller 130 may calculate a second operation current of 150 mA by performing an operation on the third current of 100 mA corresponding to the third operation 3RD_OP and the fourth current of 100 mA corresponding to the fourth operation 4TH_OP, and calculate seventh partial power PP8 by predicting that the second operation current of 150 mA will be used in the part 7TH_SECT_A of the seventh section 7TH_SECT. The controller 130 may calculate the second operation current of 150 mA by adding a current of 100 mA, obtained by multiplying a third weight of '1' by the third current of 100 mA, and a current of 50 mA, obtained by multiplying a fourth weight of '0.5' by the fourth current of 100 mA. The reason why the controller 130 decides the third weight as '1' and decides the fourth weight as '0.5' is because it has been assumed that the selected memory die is a NAND flash memory die, the fourth operation 4TH_OP is included in the second read command RD_B, and the third operation 3RD_OP is included in the first read command RD_A.

Since the controller 130 has predicted that the first and fourth operations 1ST_OP and 4TH_OP will be performed in the portion of the seventh section 7TH_SECT that overlaps the sixth section 6TH_SECT, i.e. in another part 7TH_SECT_B of the seventh section 7TH_SECT, while overlapping each other, the controller 130 may calculate a third operation current of 150 mA by performing an operation on the first current of 100 mA corresponding to the first operation 1ST_OP and the fourth current of 100 mA corresponding to the fourth operation 4TH_OP, and calculate eighth partial power PP9 by predicting that the third operation current of 150 mA will be used in the part 7TH_SECT_B of the seventh section 7TH_SECT. The controller 130 may calculate the third operation current of 150 mA by adding a current of 100 mA, obtained by multiplying a fifth weight of '1' by the first current of 100 mA, and a current of 50 mA, obtained by multiplying a sixth weight of '0.5' by the fourth current of 100 mA.

The reason why the controller 130 decides the fifth weight as '1' and decides the sixth weight as '0.5' is because it has been assumed that the selected memory die is a NAND flash memory die, the fourth operation 4TH_OP is included in the second read command RD_B, and the first operation 1ST_OP is included in the first read command RD_A.

The controller 130 may calculate the overlap power P2 which is expected to be used in the overlap operation sections by adding the seventh and eight partial powers PP8 and PP9.

The controller 130 may calculate the total power TOTAL_PW which is predicted to be used in order to perform the first and second read commands RD_A and RD_B in the selected memory die, by adding the single power P1 and the overlap power P2. The controller 130 may calculate the peak power (not shown) as the maximum instantaneous power that occurs in the fifth through eighth sections 5TH_SEC through 8TH_SEC.

Figure 7:
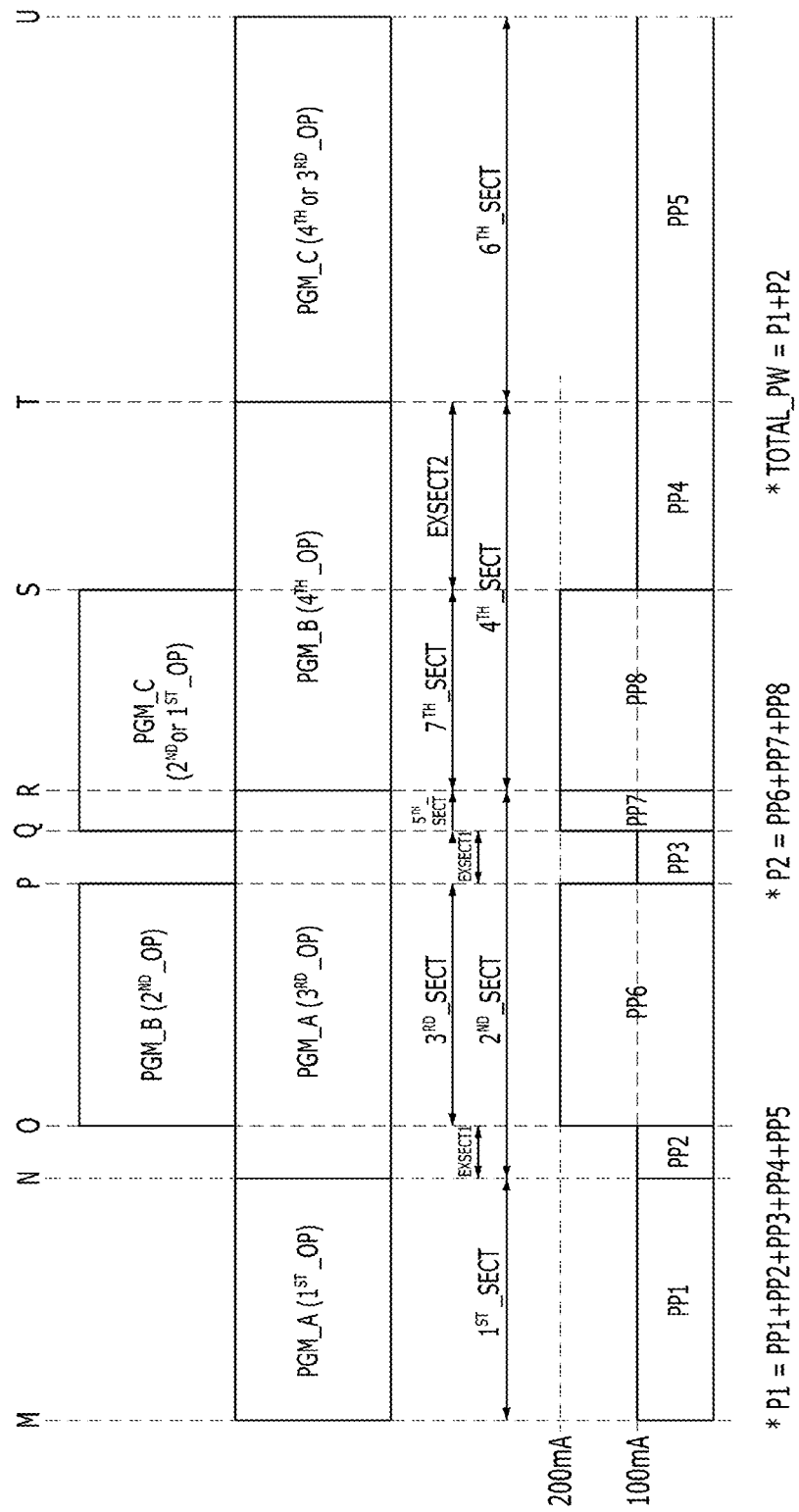
FIG. 7 illustrates a third operation of the controller according to an embodiment on a plurality of sequential commands.

FIG. 7 is a diagram for describing a third operation of the controller on a plurality of sequential commands.

FIG. 7 illustrates an operation in which the controller 130 calculates the single power P1, the overlap power P2, the peak power (not shown), and the total power TOTAL_PW as described with reference to FIGS. 1 to 4, when more write commands are additionally transferred during the operation of the controller 130, corresponding to the case in which the first and second write commands PGM_A and PGM_B described with reference to FIG. 5 are sequentially transferred to the selected memory die, that is, when the first and second write commands PGM_A and PGM_B and a third write command PGM_C is also sequentially transferred to the selected memory die.

As in the example of FIG. 5, the first command may be the first write command PGM_A for storing the first data in the selected memory die, and the second command may be the second write command PGM_B for storing the second data in the selected memory die.

In the example of FIG. 7, the third write command PGM_C is a command for performing an operation of storing third data in the selected memory die. At this time, the third write command PGM_C may be treated as either of the first or second command of FIG. 5 depending on which write command the third write command PGM_C corresponds to between the first and second write commands PGM_A and PGM_B.

That is, when calculating power of the third write command PGM_C according to effects of the first write command PGM_A that is analyzed as the first command, the controller 130 may identify sub operations included in the third write command PGM_C under the supposition that the third write command PGM_C is the second command. In addition, when calculating power of the third write command PGM_C according to effects of the second write command PGM_B that is analyzed as the second command, the controller 130 may identify sub operations included in the third write command PGM_C under the supposition that the third write command PGM_C is the first command.

Specifically, it may be assumed that the controller 130 starts a write operation at a time point M in response to the first write command PGM_A, starts a write operation at a time point O in response to the second write command PGM_B, and starts a write operation at a time point Q in response to the third write command PGM_C. That is, the controller 130 may transfer the first write command PGM_A to the selected memory die, then transfer the second write command PGM_B to the selected memory die, and then transfer the third write command PGM_C to the selected memory die.

The first write command PGM_A may include a first operation 1ST_OP in which the controller 130 transfers the first data to the selected memory die and a third operation 3RD_OP in which the selected memory die physically stores the first data therein. Accordingly, the controller 130 may analyze the first write command PGM_A and identify the first operation 1ST_OP and the third operation 3RD_OP.

The controller 130 may analyze the first write command PGM_A and determine that the first operation 1ST_OP and the third operation 3RD_OP need to be sequentially performed in such manner that the operation sections thereof do not overlap each other. At this time, the controller 130 may determine that the first operation 1ST_OP of the first write command PGM_A will be performed in a first section 1ST_SECT, i.e. a section between time points M and N.

Also, the controller 130 may predict that the third operation 3RD_OP of the first write command PGM_A will be performed in a second section 2ND_SECT after the first section 1ST_SECT, i.e. a section between time points N and R.

The second write command PGM_B may include a second operation 2ND_OP in which the controller 130 transfers the second data to the selected memory die and a fourth operation 4TH_OP in which the selected memory die physically stores the second data therein. The controller 130 may analyze the second write command PGM_B and identify the second operation 2ND_OP and the fourth operation 4TH_OP.

The controller 130 may analyze the second write command PGM_B and determine that the second operation 2ND_OP and the fourth operation 4TH_OP need to be sequentially performed in such a manner that the operation sections thereof do not overlap each other. Furthermore, the controller 130 may determine that the second operation 2ND_OP needs to be performed while not overlapping the first operation 1ST_OP, after the end point of the first operation 1ST_OP. Also, the controller 130 may determine that the second operation 2ND_OP may be performed while overlapping the third operation 3RD_OP, after the end point of the first operation 1ST_OP. Since the third operation 3RD_OP is included in the first write command PGM_A and the fourth operation 4TH_OP is included in the second write command PGM_B, i.e. two write commands which are sequentially performed in one memory die, the controller 130 may determine that the third operation 3RD_OP and the fourth operation 4TH_OP need to be performed in such a manner as to not overlap each other. Therefore, the controller 130 may predict that the second operation 2ND_OP of the second write command PGM_B will be performed in a third section 3RD_SECT overlapping the second section 2ND_SECT after the first section 1ST_SECT, i.e. a section between time points O and P. Also, the controller 130 may predict that the fourth operation 4TH_OP of the second write command PGM_B will be performed in a fourth section 4TH_SECT after the second and third sections 2ND_SECT and 3RD_SECT, i.e. a section between time points R and T.

When the controller 130 analyzes the third write command PGM_C with regard to the first write command PGM_A, it may be assumed that the first write command PGM_A is the first command and the third write command PGM_C is the second command. On the other hand, when the controller 130 analyzes the third write command PGM_C with regard to the second write command PGM_B, it may be assumed that the second write command PGM_B is the second command and the third write command PGM_C is the first command.

Specifically, the controller 130 may analyze the third write command PGM_C with respect to the first write command PGM_A under the supposition that the first operation 1ST_OP and the third operation 3RD_OP are included in the first write command PGM_A and that operations having properties similar to the second operation 2ND_OP and the fourth operation 4TH_OP of the second write command PGM_B are included in the third write command PGM_C, and then determine the operation relationship between the first write command PGM_A and the third write command PGM_C accordingly.

The controller 130 may also analyze the third write command PGM_C with respect to the second write command PGM_B under the supposition that the second operation 2ND_OP and the fourth operation 4TH_OP are included in the second write command PGM_B and that operations having properties similar to the first operation 1ST_OP and the third operation 3RD_OP of the first write command PGM_A are included in the third write command PGM_C, and then determine the operation relationship between the second write command PGM_B and the third write command PGM_C accordingly.

The third write command PGM_C may for this determination be considered to include an operation, referred to as the second-or-first operation "2ND or 1ST_OP", in which the controller 130 transfers the third data to the selected memory die, and an operation referred to as the fourth-or-third operation "4TH or 3RD_OP" in which the selected memory die physically stores the third data therein. In this case, the controller 130 may analyze the third write command PGM_C and identify the second-or-first operation "2ND or 1ST_OP" and the fourth-or-third operation "4TH or 3RD_OP". Furthermore, the controller 130 may analyze the third write command PGM_C and determine that the second-or-first operation "2ND or 1ST_OP" and the fourth-or-third operation "4TH or 3RD_OP" need to be sequentially performed in such manner that operation sections thereof do not overlap each other. Furthermore, the controller 130 may determine that the second-or-first operation "2ND or 1ST_OP" needs to be performed while not overlapping the first operation 1ST_OP, after the end point of the first operation 1ST_OP. Also, the controller 130 may check that the second-or-first operation "2ND or 1ST_OP" may be performed while overlapping the third operation 3RD_OP, after the end point of the first operation 1ST_OP. Since the third operation 3RD_OP is included in the first write command PGM_A and the fourth-or-third operation "4TH or 3RD_OP" is included in the third write command PGM_C, i.e. in two write commands which are sequentially performed in one memory die, the controller 130 may determine that the third operation 3RD_OP and the fourth-or-third operation "4TH or 3RD_OP" need to be performed in such a manner that the operation sections thereof do not overlap each other. Therefore, the controller 130 may predict that the second-or-first operation "2ND or 1ST_OP" of the third write command PGM_C will be performed in a fifth section 5TH_SECT overlapping the second section 2ND_SECT after the first section 1ST_SECT, i.e. a section between time points Q and R. Also, the controller 130 may predict that the fourth-or-third operation "4TH or 3RD_OP" of the third write command PGM_C will be performed in a sixth section 6TH SECT after the second and third sections 2ND_SECT and 3RD_SECT, i.e. a section between time points T and U.

The third write command PGM_C may for the next determination be considered to include a second-or-first operation 2ND or 1ST_OP in which the controller 130 transfers the third data to the selected memory die and a fourth-or-third operation "4TH or 3RD_OP" in which the selected memory die physically stores the third data therein. In this case, the controller 130 may analyze the third write command PGM_C and identify the second-or-first operation "2ND or 1ST OP" and the fourth-or-third operation "4TH or 3RD_OP". Furthermore, the controller 130 may analyze the third write command PGM_C and determine that the second-or-first operation "2ND or 1ST OP" and the fourth-or-third operation "4TH or 3RD_OP" need to be sequentially performed in such manner that the operation sections thereof do not overlap each other. The controller 130 may determine that the second-or-first operation "2ND or 1ST OP" needs to be performed while not overlapping the second operation 2ND_OP, after the end point of the second operation 2ND_OP. Also, the controller 130 may check that the second-or-first operation "2ND or 1ST OP" may be performed while overlapping the fourth operation 4TH_OP, after the end point of the second operation 2ND_OP. Since the fourth operation 4TH_OP is included in the second write command PGM_B and the fourth-or-third operation "4TH or 3RD_OP" is included in the third write command PGM_C, i.e. in two write commands which are sequentially performed in one memory die, the controller 130 may determine that the fourth operation 4TH_OP and the fourth-or-third operation "4TH or 3RD_OP" need to be performed in such manner that the operation sections thereof do not overlap each other. Therefore, the controller 130 may predict that the second-or-first operation "2ND or 1ST OP" of the third write command PGM_C will be performed in a seventh section 7TH_SECT overlapping the fourth section 4TH_SECT after the third section 3RD_SECT, i.e. a section between time points R and S. Also, the controller 130 may predict that the fourth-or-third operation "4TH or 3RD_OP" of the third write command PGM_C will be performed in a sixth section 6TH_SECT after the seventh and fourth sections 7TH_SECT and 4TH_SECT, i.e. a section between time points T and U.

For reference, in FIG. 7, the controller 130 has predicted that the second-or-first operation "2ND or 1ST_OP" of the third write command PGM_C will overlap the first write command PGM_A in the fifth section 5TH_SECT, and overlap the second write command PGM_B in the seventh section 7TH_SECT. That is, FIG. 7 illustrates that the operation section of the second-or-first operation "2ND or 1ST_OP" of the third write command PGM_C overlaps those of both of the first and second write commands PGM_A and PGM_B, but embodiment are not limited thereto. In another embodiment, the operation section of the second-or-first operation "2ND or 1ST_OP" of the third write command PGM_C may overlap the operation section of any one of the first and second write commands PGM_A and PGM_B.

As described above, the controller 130 may identify the first to sixth operations 1ST_OP, 2ND_OP, 3RD_OP, 4TH_OP, "2ND or 1ST_OP" and "4TH or 3RD_OP" included in the first to third write commands PGM_A to PGM_C which are to be sequentially transferred to the selected memory die. Furthermore, the controller 130 may predict the operation sections of the first to sixth operations 1ST_OP, 2ND_OP, 3RD_OP, 4TH_OP, "2ND or 1ST_OP" and "4TH or 3RD_OP" included in the first to third write commands PGM_A to PGM_C, i.e. the first to seventh sections 1ST_SECT, 2ND_SECT, 3RD_SECT, 4TH_SECT, 5TH_SECT, 6TH_SECT and 7TH_SECT.

Therefore, the controller 130 may identify single operation sections in which only a respective one operation of the first to sixth operations 1ST_OP, 2ND_OP, 3RD_OP, 4TH_OP, "2ND or 1ST_OP" and "4TH or 3RD_OP" included in the first to third write commands PGM_A to PGM_C is performed, and calculate the single power P1. Furthermore, the controller 130 may identify overlap operation sections in which operations thereof are performed while overlapping each other, and calculate the overlap power P2.

Specifically, because the controller 130 has predicted that only the first operation 1ST_OP will be performed in the first section 1ST_SECT, the controller 130 may calculate first partial power PP1 by predicting that a first current of 100 mA corresponding to the first operation 1ST_OP will be used in the first section 1ST_SECT. Because the controller 130 has predicted that the second section 2ND_SECT has first partial sections EXSECT1 which do not overlap the third section 3RD_SECT and the sixth section 6TH_SECT and only the third operation 3RD_OP will be performed in the first partial sections EXSECT1, the controller 130 may calculate second partial powers PP2 and PP3 by predicting that a third current of 100 mA corresponding to the third operation 3RD_OP will be used in the first partial sections EXSECT1. Because the controller 130 has predicted that the fourth section 4TH_SECT has a second partial section EXSECT2 which does not overlap the seventh section 7TH_SECT and only the fourth operation 4TH_OP will be performed in the second partial section EXSECT2, the controller 130 may calculate a third partial power PP4 by predicting that a fourth current of 100 mA corresponding to the fourth operation 4TH_OP will be used in the second partial section EXSECT2. Furthermore, since the controller 130 has predicted that only the fourth-or-third operation "4TH or 3RD_OP" will be performed in the sixth section 6TH_SECT, the controller 130 may calculate fourth partial power PP5 by predicting that the fourth or third current of 100 mA corresponding to the fourth-or-third operation "4TH or 3RD_OP" will be used in the sixth section 6TH_SECT.

The controller 130 may calculate the single power P1, which is expected to be used in the single operation section, by adding the first partial power PP1, the second partial powers PP2 and PP3, the third partial power PP4 and the fourth partial power PP5.

Since the controller 130 has predicted that the third section 3RD_SECT will overlap the second section 2ND_SECT and the second and third operations 2ND_OP and 3RD_OP will be performed while overlapping each other in the third section 3RD_SECT, the controller 130 may calculate a first operation current of 200 mA by performing an operation on the third current of 100 mA corresponding to the third operation 3RD_OP and the second current of 100 mA corresponding to the second operation 2ND_OP, and calculate fifth partial power PP6 by predicting that the first operation current of 200 mA will be used in the third section 3RD_SECT. The controller 130 may calculate the first operation current of 200 mA by adding a current of 100 mA, obtained by multiplying the second current 100 mA by a first weight of '1', and a current of 100 mA, obtained by multiplying the third current of 100 mA by a second weight of '1'. The reason why the controller 130 decides the first weight as '1' and decides the second weight as '1' is because it has been assumed that the selected memory die is a NAND flash memory die, the second operation 2ND_OP is included in the second write command PGM_B, and the third operation 3RD_OP is included in the first write command PGM_A.

Since the controller 130 has predicted that the third and second-or-first operations 3RD_OP and "2ND_ or 1ST_OP" will be performed while overlapping each other in the fifth section 5TH_SECT overlapping the third section 3RD_SECT, the controller 130 may calculate a second operation current of 200 mA by performing an operation on the third current of 100 mA corresponding to the third operation 3RD_OP and the second current of 100 mA corresponding to the second-or-first operation "2ND or 1ST_OP", and calculate sixth partial power PP7 by predicting that the second operation current of 200 mA will be used in the fifth section 5TH_SECT. The controller 130 may calculate the second operation current of 200 mA by adding a current of 100 mA, obtained by multiplying the third current of 100 mA by a third weight of '1', and a current of 100 mA, obtained by multiplying the second current of 100 mA by a fourth weight of '1'. The reason why the controller 130 decides the third weight as '1' and decides the fourth weight as '1' is that it has been assumed that the selected memory die is a NAND flash memory die, the third operation 3RD_OP is included in the first write command PGM_A, and the second-or-first operation "2ND or 1ST_OP" is included in the third write command PGM_C.

Since the controller 130 has predicted that the fourth and second-or-first operations 4TH_OP and "2ND or 1ST_OP" will be performed while overlapping each other in the seventh section 7TH_SECT overlapping the fourth section 4TH_SECT, the controller 130 may calculate a third operation current of 200 mA by performing an operation on the fourth current of 100 mA corresponding to the fourth operation 4TH_OP and the first current of 100 mA corresponding to the second-or-first operation "2ND or 1ST_OP", and calculate seventh partial power PP8 by predicting that the third operation current of 200 mA will be used in the seventh section 7TH_SECT. The controller 130 may calculate the third operation current of 200 mA by adding a current of 100 mA, obtained by multiplying the fourth current of 100 mA by a fifth weight of '1', and a current of 100 mA, obtained by multiplying the first current of 100 mA by a sixth weight of '1'. The reason why the controller 130 decides the fifth weight as '1' and decides the sixth weight as '1' is that it has been assumed that the selected memory die is a NAND flash memory die, the fourth operation 4TH_OP is included in the second write command PGM_B, and the second-or-first operation "2ND or 1ST_OP" is included in the third write command PGM_C.

The controller 130 may calculate the overlap power P2 which is expected to be used in the overlap operation section, by adding the fifth partial power PP6, the sixth partial power PP7 and the seventh partial power PPB.

The controller 130 may calculate the total power TOTAL_PW which is predicted to be used in order to perform the first to third write commands PGM_A to PGM_C in the selected memory die, by adding the single power P1 and the overlap power P2.

Figure 8:
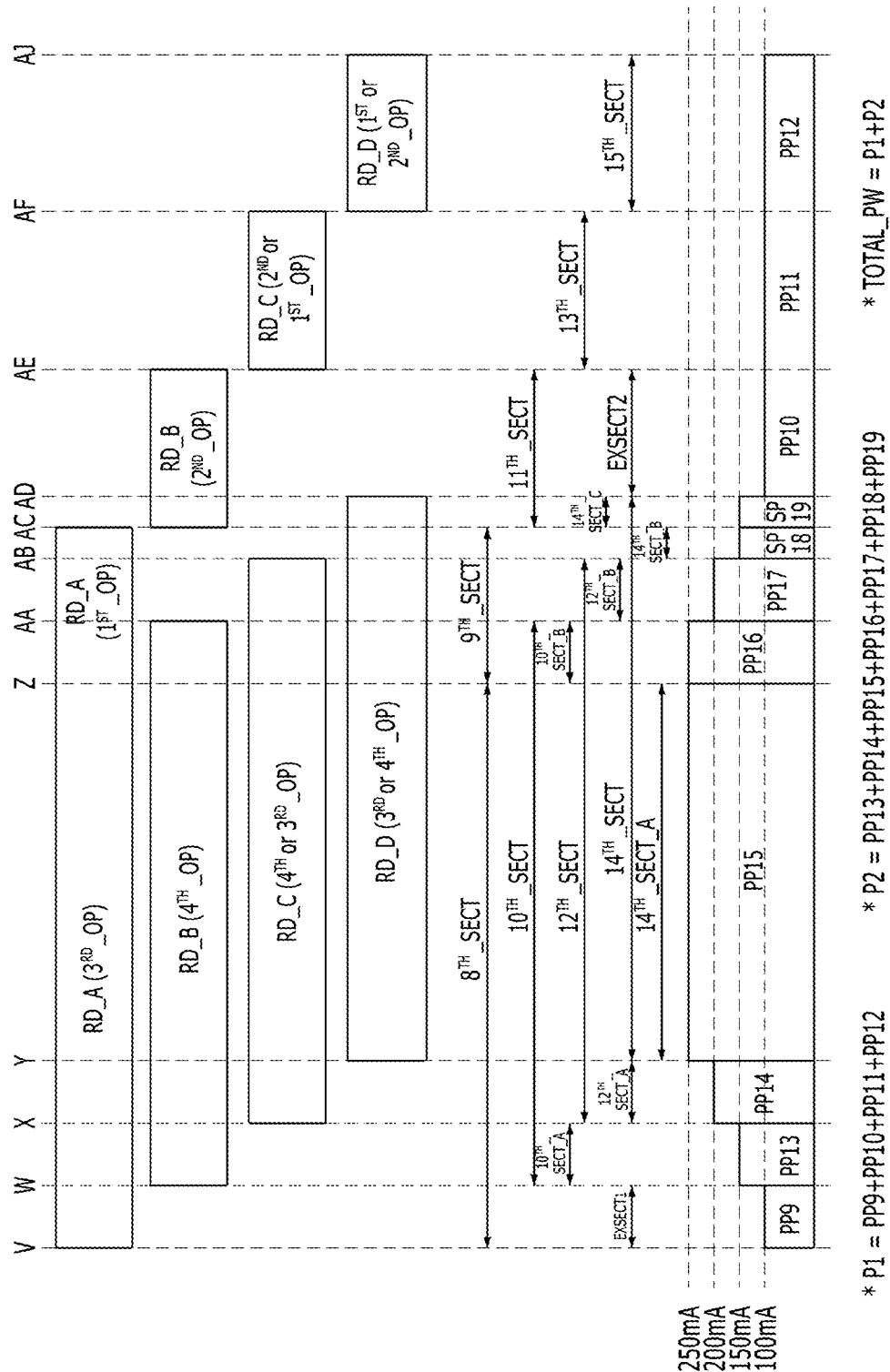
FIG. 8 illustrates a fourth operation of the controller according to an embodiment on a plurality of sequential commands.

FIG. 8 is a diagram for describing a fourth operation of the controller on a plurality of sequential commands.

FIG. 8 illustrates an operation in which the controller 130 calculates the single power P1, the overlap power P2, the peak power, and the total power TOTAL_PW as described with reference to FIGS. 1 to 4, when more read commands are transferred to the operation of the controller 130 compared to the case in which the first and second read commands RD_A and RD_B are sequentially transferred to the selected memory die as described with reference to FIG. 6, that is, when the first and second read commands RD_A and RD_B, a third read command RD_C, and a fourth read command RD_D are sequentially transferred to the selected memory die.

As in the example of FIG. 6, in the example of FIG. 8 the first command is the first read command RD_A for reading the third data from the selected memory die, and the second command is the second read command RD_B for reading the fourth data from the selected memory die.

In the example FIG. 8, the third read command RD_C is a command for performing an operation of reading fifth data from the selected memory die, and the fourth read command RD_D is a command for performing an operation of reading sixth data from the selected memory die. At this time, the third read command RD_C may be treated as any one of the first and second commands depending on to which read command the third read command RD_C is being analyzed with regard to between the first and second read commands RD_A and RD_B. Furthermore, the fourth read command RD_D may be treated as any one of the first and second commands depending on to which read command the fourth read command RD_D is being analyzed with regard to among the first to third read commands RD_A to RD_C.

That is, when calculating powers of the third and fourth read commands RD_C and RD_D in response to the first read command RD_A as the first command, the controller 130 may identify sub operations included in the third and fourth read commands RD_C and RD_D under the supposition that each of the third and fourth read commands RD_C and RD_D is the second command. Also, when calculating powers of the third and fourth read commands RD_C and RD_D in response to the second read command RD_B as the second command, the controller 130 may identify sub operations included in the third and fourth read commands RD_C and RD_D under the supposition that each of the third and fourth read commands RD_C and RD_D is the first command. Furthermore, when calculating power of the fourth read command RD_D in response to the third read command RD_C as the first command, the controller 130 may identify sub operations included in the fourth read command RD_D under the supposition that the fourth read command RD_D is the second command. Also, when calculating power of the fourth read command RD_D in response to the third read command RD_C as the second command, the controller 130 may identify sub operations included in the fourth read command RD_D under the supposition that the fourth read command RD_D is the first command.

Specifically, it may be assumed that that the controller 130 starts a read operation at a time point V in response to the first read command RD_A, starts a read operation at a time point W in response to the second read command RD_B, starts a read operation at a time point X in response to the third read command RD_C, and starts a read operation at a time point Y in response to the fourth read command RD_D. In other words, the controller 130 may transfer the first read command RD_A to the selected memory die, then transfer the second read command RD_B to the selected memory die, then transfer the third read command RD_C to the selected memory die, and then transfer the fourth read command RD_D to the selected memory die.

The first read command RD_A may include a third operation 3RD_OP in which the selected memory die physically reads the third data therein and a first operation 1ST_OP in which the selected memory die transfers the third data to the controller 130. Accordingly, the controller 130 may analyze the first read command RD_A and identify the first operation 1ST_OP and the third operation 3RD_OP.

The controller 130 may analyze the first read command RD_A and determine that the third operation 3RD_OP and the first operation 1ST_OP need to be sequentially performed in such manner that the operation sections thereof do not overlap each other. At this time, the controller 130 may predict that the third operation 3RD_OP of the first read command RD_A will be performed during an eighth section 8TH_SECT, i.e. a section between time points V and Z. Furthermore, the controller 130 may predict that the first operation 1ST_OP of the first read command RD_A will be performed during a ninth section is 9TH_SECT after the eighth section 8TH_SECT, i.e. a section between time points Z and AC.

The second read command RD_B may include a fourth operation 4TH_OP in which the selected memory die physically reads the fourth data therein and a second operation 2ND_OP in which the selected memory die transfers the fourth data to the controller 130. The controller 130 may therefore analyze the second read command RD_B and identify the second operation 2ND_OP and the fourth operation 4TH_OP.

The controller 130 may determine the second read command RD_B and check that the fourth operation 4TH_OP and the second operation 2ND_OP need to be sequentially performed in such manner that the operation sections thereof do not overlap each other. Since the third operation 3RD_OP and the fourth operation 4TH_OP are included in the first read command RD_A and the second read command RD_B, that is, two read commands which are sequentially performed in one memory die, the controller 130 may determine that the third operation 3RD_OP and the fourth operation 4TH_OP can be performed while overlapping each other. Therefore, the controller 130 may check determine the fourth operation 4TH_OP can be performed while the operation section thereof overlaps that of the third operation 3RD_OP, after the start point of the third operation 3RD_OP. Also, the controller 130 may determine that the fourth operation 4TH_OP can be performed while the operation section thereof overlaps that of the first operation 1ST_OP which is started after the end point of the third operation 3RD_OP. That is, the controller 130 may determine that the fourth operation 4TH_OP can be performed while the operation section thereof overlaps that of at least one of the third operation 3RD_OP and the first operation 1ST_OP. Furthermore, the controller 130 may determine that the second operation 2ND_OP needs to be performed in such manner that the operation section thereof does not overlap that of the first operation 1ST_OP, after the end point of the first operation 1ST_OP. Therefore, the controller 130 may predict that the fourth operation 4TH_OP of the second read command RD_B will be performed during a tenth section 10TH_SECT overlapping at least one of the eighth and ninth sections 8TH_SECT and 9TH_SECT, i.e. a section between time points W and AA. For reference, FIG. 8 illustrates that the tenth section 10TH_SECT overlaps both of the eighth and ninth sections 8TH_SECT and 9TH_SECT, but embodiments are not limited thereto. In another embodiment, the tenth section 10TH_SECT may overlap only any one of the eighth and ninth sections 8TH_SECT and 9TH_SECT. The controller 130 may predict that the second operation 2ND_OP of the second read command RD_B will be performed during an 11*th* section 11TH_SECT after the ninth and tenth sections 9TH_SECT and 10TH_SECT, i.e. a section between time points AC and AE.

When the controller 130 analyzes the third read command RD_C in response to the first read command RD_A, it may be assumed that the first read command RD_A is the first command and the third read command RD_C is the second command. Also, when the controller 130 analyzes the third read command RD_C in response to the second read command RD_B, it may do so as if the second read command RD_B is the second command and the third read command RD_C is the first command.

Specifically, the controller 130 may analyze the third read command RD_C with respect to the first read command RD_A under the supposition that the first operation 1ST_OP and the third operation 3RD_OP are included in the first read command RD_A and that operations having properties similar to the second operation 2ND_OP and the fourth operation 4TH_OP of the second read command RD_B are included in the third read command RD_C, and then define the operation relationship between the first read command RD_A and the third read command RD_C accordingly.

In this example, the third read command RD_C may include the fourth-or-third operation "4TH or 3RD_OP" in which the selected memory die physically reads the fifth data therein and the second-or-first operation "2ND or 1ST_OP" in which the selected memory die transfers the fifth data to the controller 130. Accordingly, the controller 130 may analyze the third read command RD_C and identify the second-or-first operation "2ND or 1ST_OP" and the fourth-or-third operation "4TH or 3RD_OP. Furthermore, the controller 130 may analyze the third read command RD_C and determine that the fourth-or-third operation "4TH or 3RD_OP" and the second-or-first operation "2ND or 1ST_OP" need to be sequentially performed in such manner that the operation sections thereof do not overlap each other. Since the third operation 3RD_OP and the fourth-or-third operation "4TH or 3RD_OP" are included in the first read command RD_A and the third read command RD_C, respectively, that is, two read commands which are sequentially performed in one memory die, the controller 130 may determine that the third operation 3RD_OP and the fourth-or-third operation "4TH or 3RD_OP" can be performed while overlapping each other. Therefore, the controller 130 may determine that the fourth-or-third operation "4TH or 3RD_OP" can be performed while the operation section thereof overlaps that of the third operation 3RD_OP, after the start point of the third operation 3RD_OP. Also, the controller 130 may determine that the fourth-or-third operation "4TH or 3RD_OP" can be performed while the operation section thereof overlaps that of the first operation 1ST_OP which is started after the end point of the third operation 3RD_OP. That is, the controller 130 may determine that the fourth-or-third operation "4TH or 3RD_OP" can be performed while the operation section thereof overlaps that of at least one of the third operation 3RD_OP and the first operation 1ST_OP. Furthermore, the controller 130 may determine that the second-or-first operation "2ND or 1ST_OP" needs to be performed in such manner the operation section thereof does not overlap that of the first operation 1ST_OP, after the end point of the first operation 1ST_OP. Therefore, the controller 130 may predict that the fourth-or-third operation "4TH or 3RD_OP" of the third read command RD_C will be performed during a 12th section 12TH_SECT overlapping at least one of the eighth and ninth sections 8TH_SECT and 9TH_SECT, i.e. a section between time points X and AB. For reference, FIG. 8 illustrates that the 12th section 12TH_SECT overlaps both of the eighth and ninth sections 8TH_SECT and 9TH_SECT, but this is only an embodiment. In another embodiment, the 12th section 12TH_SECT may overlap only any one of the eighth and ninth sections 8TH_SECT and 9TH_SECT. The controller 130 may predict that the second-or-first operation "2ND or 1ST_OP" of the third read command RD_C will be performed during a 13th section 13TH_SECT after the ninth and 12th sections 9TH_SECT and 12TH_SECT, i.e. a section between time points AE and AF.

The controller 130 may then determine the operation relationship between the second read command RD_B and the third read command RD_C.

Since the fourth operation 4TH_OP and the fourth-or-third operation "4TH or 3RD_OP" are included in the second and third read commands RD_B and RD_C, respectively, that is, two read commands which are sequentially performed in one memory die, the controller 130 may determine that the fourth operation 4TH_OP and the fourth-or-third operation "4TH or 3RD_OP" can be performed while overlapping each other. Therefore, the controller 130 may determine that the fourth-or-third operation "4TH or 3RD_OP" can be performed while the operation section thereof overlaps that of the fourth operation 4TH_OP, after the start point of the fourth operation 4TH_OP. Furthermore, the controller 130 may determine that the fourth-or-third operation "4TH or 3RD_OP" can be performed while the operation section thereof overlaps that of the second operation 2ND_OP which is started after the end point of the fourth operation 4TH_OP. That is, the controller 130 may determine that the fourth-or-third operation "4TH or 3RD_OP" can be performed while the operation section thereof overlaps that of at least one of the fourth operation 4TH_OP and the second operation 2ND_OP. Also, the controller 130 may determine that the second-or-first operation "2ND or 1ST_OP" needs to be performed while the operation section thereof does not overlap that of the second operation 2ND_OP, after the end point of the second operation 2ND_OP. Therefore, the controller 130 may predict that the fourth-or-third operation "4TH or 3RD_OP" of the third read command RD_C will be performed during the 12th section 12TH_SECT overlapping at least one of the tenth and 11th sections 10TH_SECT and 11TH_SECT, i.e. the section between time points X and AB. For reference, FIG. 8 illustrates that the 12th section 12TH_SECT overlaps the tenth section 10TH_SECT but does not overlap the 11th section 11TH_SECT, but this is only an embodiment. In another embodiment, the 12th section 12TH_SECT may overlap both of the tenth and 11th sections 10TH_SECT and 11TH_SECT. The controller 130 may predict that the second-or-first operation "2ND or 1ST_OP" of the third read command RD_C will be performed during the 13th section 13TH_SECT after the tenth and 12th sections 10TH_SECT and 12TH_SECT, i.e. a section between time points AE and AF.

When the controller 130 analyzes the fourth read command RD_D in response to the first read command RD_A, it may be assumed that the first read command RD_A is the first command and the fourth read command RD_D is the second command. When the controller 130 analyzes the fourth read command RD_D in response to the second read command RD_B, it may be assumed that the second read command RD_B is the second command and the fourth read command RD_D is the first command. When the controller 130 analyzes the fourth read command RD_D in response to the third read command RD_C, it may be assumed that the third read command RD_C is the first command, the fourth read command RD_D is the second command, the third read command RD_C is the second command, and the fourth read command RD_D is the first command.

Specifically, the controller 130 may analyze the fourth read command RD_D with respect to the first read command RD_A under the supposition that the first operation 1ST_OP and the third operation 3RD_OP are included in the first read command RD_A and that operations similar to the second operation 2ND_OP and the fourth operation 4TH_OP of the second read command RD_B are included in the fourth read command RD_D, and then define the operation relationship between the first read command RD_A and the fourth read command RD_D.

The fourth read command RD_D may include the third-or-fourth operation "3RD or 4TH_OP" in which the selected memory die physically reads the sixth data therein and the first-or-second operation "1ST or 2ND_OP" in which the selected memory die transfers the sixth data to the controller 130. Accordingly, the controller 130 may analyze the fourth read command RD_D and identify the first-or-second operation "1ST or 2ND_OP" and the third-or-fourth operation "3RD or 4TH_OP". Furthermore, the controller 130 may analyze the fourth read command RD_D and determine that the third-or-fourth operation "3RD or 4TH_OP" and the first-or-second operation "1ST or 2ND_OP" need to be sequentially performed while the operation sections thereof do not overlap each other. Since the third operation 3RD_OP and the third-or-fourth operation "3RD or 4TH_OP" are included in the first read command RD_A and the fourth read command RD_D, respectively, that is, two read commands which are sequentially performed in one memory die, the controller 130 may determine that the third operation 3RD_OP and the third-or-fourth operation "3RD or 4TH_OP" can be performed while overlapping each other. Therefore, the controller 130 may determine that the third-or-fourth operation "3RD or 4TH_OP" can be performed while the operation section thereof overlaps that of the third operation 3RD_OP, after the start point of the third operation 3RD_OP. Furthermore, the controller 130 may determine that the third-or-fourth operation "3RD or 4TH_OP" can be performed while the operation section thereof overlaps that of the first operation 1ST_OP which is started after the end point of the third operation 3RD_OP. That is, the controller 130 may determine that the third-or-fourth operation "3RD or 4TH_OP" can be performed while the operation section thereof overlaps that of at least one of the third operation 3RD_OP and the first operation 1ST_OP. Furthermore, the controller 130 may determine that the first-or-second operation "1ST or 2ND_OP" needs to be performed while the operation section thereof does not overlap that of the first operation 1ST_OP, after the end point of the first operation 1ST_OP. Therefore, the controller 130 may predict that the third-or-fourth operation "3RD or 4TH_OP" of the fourth read command RD_D will be performed during a 14*th* section 14TH_SECT overlapping at least one of the eighth and ninth sections 8TH_SECT and 9TH_SECT, i.e. a section between time points Y and AD. For reference, FIG. 8 illustrates that the 14*th* section 14TH_SECT overlaps both of the eighth and ninth sections 8TH_SECT and 9TH_SECT, but this is only an embodiment. In another embodiment, the 14*th* section 14TH_SECT may overlap only any one of the eighth and ninth sections 8TH_SECT and 9TH_SECT. The controller 130 may predict that the first-or-second operation "1ST or 2ND_OP" of the fourth read command RD_D will be performed during a 15*th* section 15TH_SECT after the ninth and 14*th* sections 9TH_SECT and 14TH_SECT, i.e. a section between time points AF and AJ.

The controller 130 may then determine the operation relationship between the second read command RD_B and the fourth read command RD_D.

Since the fourth operation 4TH_OP and the third-or-fourth operation "3RD or 4TH_OP" are included in the second and fourth read commands RD_B and RD_D, respectively, that is, two read commands which are sequentially performed in one memory die, the controller 130 may determine that the fourth operation 4TH_OP and the third-or-fourth operation "3RD or 4TH_OP" can be performed while overlapping each other. The controller 130 may determine that the third-or-fourth operation "3RD or 4TH_OP" can be performed while the operation section thereof overlaps that of the fourth operation 4TH_OP, after the start point of the fourth operation 4TH_OP. Also, the controller 130 may determine that the third-or-fourth operation "3RD or 4TH_OP" can be performed while the operation section thereof overlaps that of the second operation 2ND_OP which is started after the end point of the fourth operation 4TH_OP. That is, the controller 130 may determine that the third-or-fourth operation "3RD or 4TH_OP" can be performed while the operation section thereof overlaps that of at least one of the fourth operation 4TH_OP and the second operation 2ND_OP. The controller 130 may determine that the first-or-second operation "1ST or 2ND_OP" needs to be performed in such manner that the operation section thereof does not overlap that of the second operation 2ND_OP, after the end point of the second operation 2ND_OP. Therefore, the controller 130 may predict that the third-or-fourth operation "3RD or 4TH_OP" of the fourth read command RD_D will be performed during the 14*th* section 14TH_SECT overlapping at least one of the tenth and 11*th* sections 10TH_SECT and 11TH_SECT, i.e. the section between time points Y and AD. For reference, FIG. 8 illustrates that the 14*th* section 14TH_SECT overlaps both of the tenth and 11*th* sections 10TH_SECT and 11TH_SECT, but this is only an embodiment. In another embodiment, the 14*th* section 14TH_SECT may overlap only any one of the tenth and 11*th* sections 10TH_SECT and 11TH_SECT. The controller 130 may predict that the first-or-second operation "1ST or 2ND_OP" of the fourth read command RD_D will be performed during the 15*th* section 15TH_SECT after the 11*th* and 14*th* sections 11TH_SECT and 14TH_SECT, i.e. the section between time points AF and AJ.

When the controller 130 analyzes the fourth read command RD_D in response to the third read command RD_C, it may be assumed that the fourth read command RD_D is the second command when the third read command RD_C is the first command. This is similar to the assumption that the fourth read command RD_D is the second command in response to the first read command RD_A as the first command. Therefore, the controller 130 may analyze the fourth read command RD_D in response to the third read command RD_C in a substantially similar manner to the operation of analyzing the fourth read command RD_D in response to the first read command RD_A. Therefore, the detailed descriptions thereof will be omitted herein.

Similarly, when the controller 130 analyzes the fourth read command RD_D in response to the third read command RD_C, it may be assumed that the fourth read command RD_D is the first command when the third read command RD_C is the second command. This is similar to the assumption that the fourth read command RD_D is the first command in response to the second read command RD_B as the second command. Therefore, the controller 130 may analyze the fourth read command RD_D in response to the third read command RD_C in a substantially similar manner to the operation of analyzing the fourth read command RD_D in response to the second read command RD_B. Therefore, the detailed descriptions thereof will be omitted herein.

As described above, the controller 130 may identify the eight operations (operations 1ST_OP, 2ND_OP, 3RD_OP, 4TH_OP, "4TH or 3RD_OP", "2ND or 1ST_OP", "3RD or 4TH_OP", and "1ST or 2ND_OP") included in the first to fourth read commands RD_A to RD_D which are to be sequentially transferred to the selected memory die. Furthermore, the controller 130 may predict the operation sections of the operations 1ST_OP, 2ND_OP, 3RD_OP, 4TH_OP, "4TH or 3RD_OP", "2ND or 1ST_OP", "3RD or 4TH_OP", and "1ST or 2ND_OP" included in the first to fourth read commands RD_A to RD_D, i.e. the eighth to 15*th* sections 8TH_SECT, 9TH_SECT, 10TH_SECT, 11TH_SECT, 12TH_SECT, 13TH_SECT, 14TH_SECT and 15TH_SECT.

Therefore, the controller 130 may identify single operation sections in which only any one operation of the operations 1ST_OP, 2ND_OP, 3RD_OP, 4TH_OP, "4TH or 3RD_OP", "2ND or 1ST_OP", "3RD or 4TH_OP", and "1ST or 2ND_OP" included in the first to fourth read commands RD_A to RD_D is performed, and calculate the single power P1. Furthermore, the controller 130 may identify overlap operation sections in which two or more of those operations are performed while overlapping each other, and calculate the overlap power P2.

Specifically, since the controller 130 has predicted that the eighth section 8TH_SECT has a first partial section EXSECT1 which does not overlap the tenth section 10TH_SECT, the 12*th* section 12TH_SECT and the 14*th* section 14TH_SECT and only the third operation 3RD_OP will be performed in the first partial section EXSECT1, the controller 130 may calculate eighth partial power PP9 by predicting that a third current of 100 mA corresponding to the third operation 3RD_OP will be used in the first partial section EXSECT1. Furthermore, since the controller 130 has predicted that the 11*th* section 11TH_SECT has a second partial section EXSECT2 which does not overlap the 12*th* section 12TH_SECT and the 14*th* section 14TH_SECT and the second operation 2ND_OP will be independently performed in the second partial section EXSECT2, the controller 130 may calculate ninth partial power PP10 by predicting that a second current of 100 mA corresponding to the second operation 2ND_OP will be used in the second partial section EXSECT2. Furthermore, since the controller 130 has predicted that only the second operation 2ND_OP or the first operation 1ST_OP will be performed in the 13*th* section 13TH_SECT, the controller 130 may calculate tenth partial power PP11 by predicting that the second or first current of 100 mA corresponding to the second-or-first operation "2ND or 1ST_OP" will be used in the 13*th* section 13TH_SECT. Furthermore, since the controller 130 has predicted that only the first operation 1ST_OP or the second operation 2ND_OP will be performed in the 15*th* section 15TH_SECT, the controller 130 may calculate 11*th* partial power PP12 by predicting that the first or second current of 100 mA corresponding to the first-or-second operation "1ST or 2ND_OP" will be used in the 15*th* section 15TH_SECT. The controller 130 may calculate the single power P1, which is expected to be used in the single operation section, by adding the eighth partial power PP9, the ninth partial power PP10, the tenth partial power PP11 and the 11*th* partial power PP12.

Since the controller 130 has predicted that the third and fourth operations 3RD_OP and 4TH_OP will be performed while overlapping each other in the tenth section 10TH_SECT which overlaps the eight section 8TH_SECT but does not overlap the 12*th* section 12TH_SECT and the 14*th* section 14TH_SECT, i.e. a part 10TH_SECT_A of the tenth section 10TH_SECT, the controller 130 may calculate a fourth operation current of 150 mA by performing an operation on the third current of 100 mA corresponding to the third operation 3RD_OP and the fourth current of 100 mA corresponding to the fourth operation 4TH_OP, and calculate 12*th* partial power PP13 by predicting that the fourth operation current of 150 mA will be used in the part 10TH_SECT_A of the tenth section 10TH_SECT. The controller 130 may calculate the fourth operation current of 150 mA by adding a current of 100 mA, obtained by multiplying the third current of 100 mA by a seventh weight of '1', and a current of 50 mA, obtained by multiplying the fourth current of 100 mA by an eighth weight of '0.5'. The reason why the controller 130 decides the seventh weight as '1' and decides the eighth weight as '0.5' is because it has been assumed that the selected memory die is a NAND flash memory die, the fourth operation 4TH_OP is included in the second read command RD_B, and the third operation 3RD_OP is included in the first read command RD_A.

Since the controller 130 has predicted that the third and fourth operations 3RD_OP and 4TH_OP and the fourth-or-third operation "4TH or 3RD_OP" will be performed while overlapping each other in the 12*th* section 12TH_SECT which overlaps the eighth and tenth sections 8TH_SECT and 10TH_SECT but does not overlap the 14*th* section 14TH_SECT, i.e. a part 12TH_SECT_A of the 12*th* section 12TH_SECT, the controller 130 may calculate a fifth operation current of 200 mA by performing an operation on the third current of 100 mA corresponding to the third operation 3RD_OP, the fourth current of 100 mA corresponding to the fourth operation 4TH_OP, and the fourth or third current of 100 mA corresponding to the fourth or third operation 4TH or 3RD_OP, and calculate 13*th* partial power PP14 by predicting that the fifth operation current of 200 mA will be used in the part 12TH_SECT_A of the 12*th* section 12TH_SECT. At this time, the controller 130 may calculate the fifth operation current of 200 mA by adding up a current of 100 mA obtained by multiplying the third current of 100 mA by a ninth weight of '1', a current of 50 mA obtained by multiplying the fourth current of 100 mA by a tenth weight of '0.5', and a current of 50 mA obtained by multiplying the fourth or third current of 100 mA by an 11*th* weight of '0.5'. The reason why the controller 130 decides the ninth weight as '1', decides the tenth weight as '0.5', and decides the 11*th* weight as '0.5' is because it has been assumed that the selected memory die is a NAND flash memory die, the fourth-or-third operation "4TH or 3RD_OP" is included in the third read command RD_C, the fourth operation 4TH_OP is included in the second read command RD_B, and the third operation 3RD_OP is included in the first read command RD_A.

Since the controller 130 has predicted that the third operation 3RD_OP, the fourth operation 4TH_OP, the fourth-or-third operation "4TH or 3RD_OP" and the third-or-fourth operation "3RD or 4TH_OP" will be performed while overlapping each other in the 14*th* section 14TH_SECT which overlaps the eighth section 8TH_SECT, the tenth section 10TH_SECT and the 12*th* section 12TH_SECT, i.e. a part 14TH_SECT_A of the 14*th* section 14TH_SECT, the controller 130 may calculate a sixth operation current of 250 mA by performing an operation on the third current of 100 mA corresponding to the third operation 3RD_OP, the fourth current of 100 mA corresponding to the fourth operation 4TH_OP, the fourth or third current of 100 mA corresponding to the fourth or third operation 4TH or 3RD_OP, and the third or fourth current of 100 mA corresponding to the third or fourth operation 3RD or 4TH_OP, and calculate 14*th* partial power PP15 by predicting that the sixth operation current of 250 mA will be used in the part 14TH_SECT_A of the 14*th* section 14TH_SECT. The controller 130 may calculate the sixth operation current of 250 mA by adding up a current of 100 mA obtained by multiplying the third current of 100 mA by a 12*th* weight of '1', a current of 50 mA obtained by multiplying the fourth current of 100 mA by a 13*th* weight of '0.5', a current of 50 mA obtained by multiplying the fourth or third current of 100 mA by a 14*th* weight of '0.5', and a current of 50 mA obtained by multiplying the third or fourth current of 100 mA by a 15*th* weight of '0.5'. The reason why the controller 130 decides the 12*th* weight as '1', decides the 13*th* weight as '0.5', decides the 14*th* weight as '0.5', and decides the 15*th* weight as '0.5' is because it has been assumed that the selected memory die is a NAND flash memory die, the third-or-fourth operation "3RD or 4TH_OP" is included in the fourth read command RD_D, the fourth-or-third operation "4TH or 3RD_OP" is included in the third read command RD_C, the fourth operation 4TH_OP is included in the second read command RD_B, and the third operation 3RD_OP is included in the first read command RD_A.

Since the controller 130 has predicted that the first operation 1ST_OP, the fourth operation 4TH_OP, the fourth-or-third operation "4TH or 3RD_OP" and the third-or-fourth operation "3RD or 4TH_OP" will be performed while overlapping one another in the tenth section 10TH_SECT which overlaps the ninth section 9TH_SECT, the 12th section 12TH_SECT and the 14th section 14TH_SECT, i.e. another part 10TH_SECT_B of the tenth section 10TH_SECT, the controller 130 may calculate a seventh operation current of 250 mA by performing an operation on the first current of 100 mA corresponding to the first operation 1ST_OP, the fourth current of 100 mA corresponding to the fourth operation 4TH_OP, the fourth or third current of 100 mA corresponding to the fourth or third operation 4TH or 3RD_OP, and the third or fourth current of 100 mA corresponding to the third or fourth operation 3RD or 4TH_OP, and calculate 15th partial power PP16 by predicting that the seventh operation current of 250 mA will be used in the part 10TH_SECT_B of the tenth section 10TH_SECT. The controller 130 may calculate the seventh operation current of 250 mA by adding up a current of 100 mA obtained by multiplying the first current of 100 mA by a 16th weight of '1', a current of 50 mA obtained by multiplying the fourth current of 100 mA by a 17th weight of '0.5', a current of 50 mA obtained by multiplying the fourth or third current of 100 mA by an 18th weight of '0.5', and a current of 50 mA obtained by multiplying the third or fourth current of 100 mA by a 19th weight of '0.5'. The reason why the controller 130 decides the 16th weight as '1', decides the 17th weight as '0.5', decides the 18th weight as '0.5' and decides the 19th weight as '0.5' is because it has been assumed that the selected memory die is a NAND flash memory die, the third-or-fourth operation "3RD or 4TH_OP" is included in the fourth read command RD_D, the fourth-or-third operation "4TH or 3RD_OP" is included in the third read command RD_C, the fourth operation 4TH_OP is included in the second read command RD_B, and the first operation 1ST_OP is included in the first read command RD_A.

Since the controller 130 has predicted that the first operation 1ST_OP, the fourth-or-third operation "4TH or 3RD_OP" and the third-or-fourth operation "3RD or 4TH_OP" will be performed while overlapping one another in the 12th section 12TH_SECT which overlaps the ninth section 9TH_SECT and the 14th section 14TH_SECT, i.e. another part 12TH_SECT_B of the 12th section 12TH_SECT, the controller 130 may calculate an eighth operation current of 200 mA by performing an operation on the first current of 100 mA corresponding to the first operation 1ST_OP, the fourth or third current of 100 mA corresponding to the fourth-or-third operation "4TH or 3RD_OP" and the third or fourth current of 100 mA corresponding to the third or fourth operation 3RD or 4TH_OP, and calculate 16th partial power PP17 by predicting that the eighth operation current of 200 mA will be used in the part 12TH_SECT_B of the 12th section 12TH_SECT. The controller 130 may acquire the eighth operation current of 200 mA by adding up a current of 100 mA obtained by multiplying the first current of 100 mA by a 20th weight of '1', a current of 50 mA obtained by multiplying the fourth or third current of 100 mA by a 21st weight of '0.5', and a current of 50 mA obtained by multiplying the third or fourth current of 100 mA by a 22nd weight of '0.5'. The reason why the controller 130 decides the 20th weight as '1', decides the 21st weight as '0.5', and decides the 22nd weight as '0.5' is because it has been assumed that the selected memory die is a NAND flash memory die, the third-or-fourth operation "3RD or 4TH_OP" is included in the fourth read command RD_D, the fourth-or-third operation "4TH or 3RD_OP" is included in the third read command RD_C, and the first operation 1ST_OP is included in the first read command RD_A.

Since the controller 130 has predicted that the first operation 1ST_OP and the third-or-fourth operation "3RD or 4TH_OP" will be performed while overlapping each other in the 14th section 14TH_SECT overlapping the ninth section 9TH_SECT, i.e. another part 14TH_SECT_B of the 14th section 14TH_SECT, the controller 130 may calculate a ninth operation current of 150 mA by performing an operation on the first current of 100 mA corresponding to the first operation 1ST_OP and the third or fourth current of 100 mA corresponding to the third or fourth operation 3RD or 4TH_OP, and calculate 17th partial power PP18 by predicting that the ninth operation current of 150 mA will be used in the part 14TH_SECT_B of the 14th section 14TH_SECT. The controller 130 may calculate the ninth operation current of 150 mA by adding a current of 100 mA obtained by multiplying the first current of 100 mA by a 23rd weight of '1' and a current of 50 mA obtained by multiplying the third or fourth current of 100 mA by a 24th weight of '0.5'. The reason why the controller 130 decides the 23rd weight as '1' and decides the 24th weight as '0.5' is because it has been assumed that the selected memory die is a NAND flash memory die, the third-or-fourth operation "3RD or 4TH_OP" is included in the fourth read command RD_D, and the first operation 1ST_OP is included in the first read command RD_A.

Since the controller 130 has predicted that the second operation 2ND_OP and the third-or-fourth operation "3RD or 4TH_OP" will be performed to overlap each other in the 14th section 14TH_SECT overlapping the 11th section 11TH_SECT, i.e. still another part 14TH_SECT_C of the 14th section 14TH_SECT, the controller 130 may calculate a tenth operation current of 150 mA by performing an operation on the second current of 100 mA corresponding to the second operation 2ND_OP and the third or fourth current of 100 mA corresponding to the third or fourth operation 3RD or 4TH_OP, and calculate 18th partial power PP19 by predicting that the tenth operation current of 150 mA will be used in the part 14TH_SECT_C of the 14th section 14TH_SECT. The controller 130 may calculate the tenth operation current of 150 mA by adding a current of 100 mA obtained by multiplying the second current of 100 mA by a 25th weight of '1' and a current of 50 mA obtained by multiplying the third or fourth current of 100 mA by a 26th weight of '0.5'. The reason why the controller 130 decides the 25th weight as '1' and decides the 26th weight as '0.5' is because it has been assumed that the selected memory die is a NAND flash memory die, the third-or-fourth operation "3RD or 4TH_OP" is included in the fourth read command RD_D, and the second operation 2ND_OP is included in the second read command RD_B.

The controller 130 may calculate the overlap power P2, which is expected to be used in the overlap operation section, by adding up the 12th partial power PP13, the 13th partial power PP14, the 14th partial power PP15, the 15th partial power PP16, the 16th partial power PP17, the 17th partial power PP18 and the 18th partial power PP19.

The controller 130 may calculate the total power TOTAL_PW, which is predicted to be used in order to perform the first to fourth read commands RD_A to RD_D in the selected memory die, by adding the single power P1 and the overlap power P2.

Figure 9:
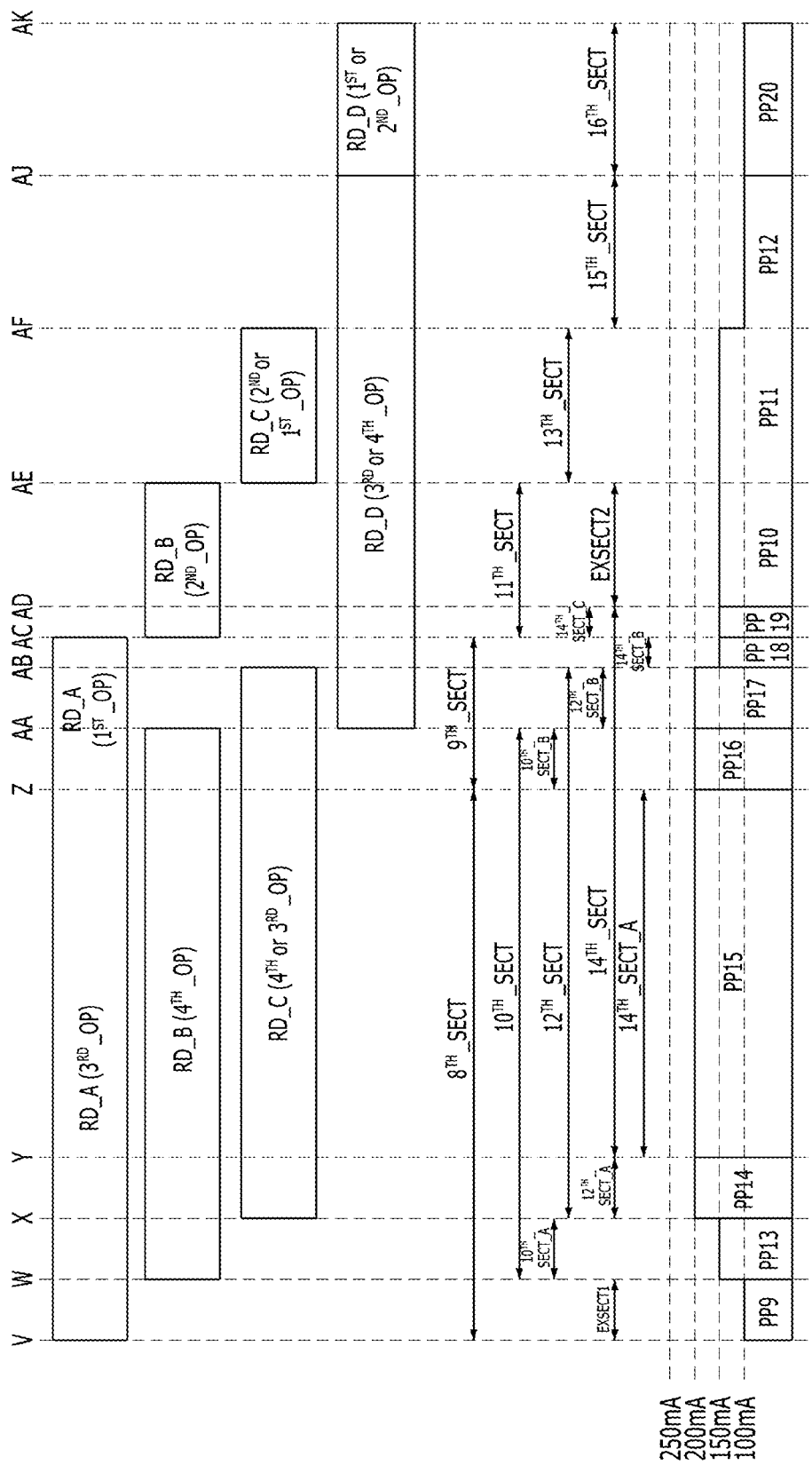
FIG. 9 illustrates a fifth operation of the controller according to an embodiment on a plurality of sequential commands having times adjusted according to a maximum peak power.

FIG. 9 illustrates a fifth operation of the controller 130 according to an embodiment on a plurality of sequential commands having times adjusted according to a maximum peak power.

FIG. 9 shows the first to fourth read commands RD_A to RD_D of FIG. 8 after the controller 130 adjusts the operation time points of the operations thereof to keep the peak power at less than or equal to a peak power limit corresponding to 200 mA.

In an embodiment, the controller 130 determines that starting an operation at the earliest time that operation could be performed would cause the peak power to exceed the peak power limit, and in response evaluates instead starting that operation at a later time coinciding with the end of a previously-started operation. For example, upon detecting that starting an third-or-fourth operation "3RD or 4TH_OP" included in the fourth read command RD_D ("the operation") at time Y (as shown in FIG. 8) would cause the peak power to exceed the peak power limit, the controller 130 would in response evaluate starting the third-or-fourth operation "3RD or 4TH_OP" at time Z (when the third operation 3RD_OP of the first read command RD_A ends), would determine that starting the third-or-fourth operation "3RD or 4TH_OP" at time Z would cause the peak power to exceed the peak power limit between times Z and AA, and would therefore then evaluate starting the third-or-fourth operation "3RD or 4TH_OP" at time AA (when the fourth operation 4TH_OP of the second read command RD_B ends), would determine that starting the third-or-fourth operation "3RD or 4TH_OP" at time AA would not cause the peak power to exceed the peak power limit, and would therefore schedule the third-or-fourth operation "3RD or 4TH_OP" to start at time AA, as shown in FIG. 9.

Accordingly, to keep the peak power in sections 14TH_SECT_A and 10TH_SECT_B within the specified limit, the third-or-fourth operation "3RD or 4TH_OP" included in the fourth read command RD_D is adjusted to start after the fourth operation 4TH OP included in the second read command RD_B (i.e. at time AA), and the first-or-second operation "1ST or 2ND_OP" included in the fourth read command RD_D is adjusted to occur after the third-or-fourth operation "3RD or 4TH_OP" included in the fourth read command RD_D (i.e., at time AJ). Accordingly, the third-or-fourth operation "3RD or 4TH_OP" included in the fourth read command RD_D begins at time AA (instead of beginning at time Y as shown in FIG. 8) and ends at time AJ, and the first-or-second operation "1ST or 2ND_OP" included in the fourth read command RD_D begins at time AJ and ends at time AK.

As a result of the controller 130 adjusting the operation time points as described above, the 14th partial power PP15 and the 15th partial power PP16 are reduced by an amount corresponding to a decrease in the operation current of 50 mA, the 9th partial power PP10 and 10th partial power PP11 are increased by an amount corresponding to an increase in the operation current of 50 mA, and a new 21st partial power PP20 occurs during a 16th section 16TH_SECT and has a value corresponding to an operation current of 100 mA.

Accordingly, the controller 130 may calculate the single power P1 by adding up the 8th partial power PP9, the 11th partial power PP12, and the 19th partial power PP20, and calculate the overlap power P2, which is expected to be used in the overlap operation section, by adding up the 9th partial power PP10, the 10th partial power PP11, the 12th partial power PP13, the 13th partial power PP14, the 14th partial power PP15, the 15th partial power PP16, the 16th partial power PP17, the 17th partial power PP18 and the 18th partial power PP19.

The controller 130 may calculate the total power TOTAL_PW, which is predicted to be used in order to perform the first to fourth read commands RD_A to RD_D in the selected memory die, by adding the single power P1 and the overlap power P2. Here, the total power TOTAL_PW may be higher than the total power TOTAL_PW in the example of FIG. 8, but the maximum peak power is lower.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
a memory device comprising a plurality of memory dies; and
a controller configured to perform:
analyzing a first command and a second command when the first and second commands are sequentially transferred to any one selected memory die of the plurality of memory dies, analyzing the first command and second command including identifying first and third operations of the first command and second and fourth operations of the second command, wherein the first operation and the second operation are not be able to be performed while operation sections thereof overlap each other, wherein the third operation is able to be performed while an operation section thereof overlaps an operation section of the second operation, and wherein the fourth operation is able to be performed while an operation section thereof overlaps an operation section of the first operation,
calculating a single power which is expected to be used in one or more single operation sections in which only any one respective operation of the first to fourth operations is performed,
calculating an overlap power which is expected to be used in one or more overlap operation sections in which a respective plurality of operations of the of the first to fourth operations are performed while overlapping each other,
calculating a total power which is expected to be used when the first and second commands are performed in the selected memory die by adding the single power and the overlap power according to operation time points of the first to fourth operations, and
calculating a peak power according to a largest value of the powers respectively expected to be used in the one or more overlap operation sections.

2. The memory system of claim 1, wherein the controller adjusts the operation time points of the first to fourth operations such that the total power is minimized while the peak power is maintained at a value smaller than a predetermined reference value.

3. The memory system of claim 2, wherein calculating the overlap power comprises:
determining values of a plurality of preset weights according to the types of the first and second commands and the type of the selected memory die, calculating an operation current by applying the preset weights to two or more currents respectively corresponding to two or more operations which are performed while overlapping each other in one of the overlap operation sections, and calculating the overlap power by predicting that the operation current will be used in the overlap operation section.

4. The memory system of claim 3, wherein when the first command is a first write command for storing first data in the selected memory die and the second command is a second write command for storing second data in the selected memory die, the controller:

identifies, as the first operation, an operation of transferring the first data to the selected memory die and predicts that the first operation will be performed during a first section, identifies, as the third operation, an operation in which the selected memory die physically stores the first data therein after the first section and predicts that the third operation will be performed during a second section, identifies, as the second operation, an operation of transferring the second data to the selected memory die after the first section and predicts that the second operation will be performed during a third section overlapping the second section, and identifies, as the fourth operation, an operation in which the selected memory die physically stores the second data therein after the second and third sections and predicts that the fourth operation will be performed during a fourth section.

5. The memory system of claim 4, wherein the controller calculates the single power by adding up a first partial power obtained by predicting that a first current corresponding to the first operation will be used in the first section, a second partial power obtained by predicting that a third current corresponding to the third operation will be used in a part of the second section that does not overlap the third section, and a third partial power obtained by predicting that a fourth current corresponding to the fourth operation will be used in the fourth section, calculates a first operation current by performing an operation on the third current and a second current corresponding to the second operation, and calculates the peak power by predicting that the first operation current will be used in the third section.

6. The memory system of claim 5, wherein the controller calculates the first operation current by adding a current obtained by multiplying the second current by a first weight to a current obtained by multiplying the third current by a second weight.

7. The memory system of claim 3, wherein when the first command is a first read command for reading third data from the selected memory die and the second command is a second read command for reading fourth data from the selected memory die, the controller:

identifies, as the third operation, an operation in which the selected memory die physically reads the third data therein and predicts that the third operation will be performed during a fifth section, identifies, as the first operation, an operation of receiving the third data from the selected memory die after the fifth section and predicts that the first operation will be performed during a sixth section, identifies, as the fourth operation, an operation in which the selected memory die physically reads the fourth data therein after the third operation is started, and predicts that the fourth operation will be performed during a seventh section overlapping at least one of the fifth and sixth sections, and identifies, as the second operation, an operation of receiving the fourth data from the selected memory die after the sixth and seventh sections and predicts that the second operation will be performed during an eighth section.

8. The memory system of claim 7, wherein the controller calculates the single power by adding up a fourth partial power obtained by predicting that a third current corresponding to the third operation will be used in a part of the fifth section that does not overlap the seventh section, a fifth partial power obtained by predicting that a first current corresponding to the first operation will be used in a part of the sixth section that does not overlap the seventh section, and a sixth partial power obtained by predicting that a second current corresponding to the second operation will be used in the eighth section, calculates a second operation current by performing an operation on the third current and a fourth current corresponding to the fourth operation and a third operation current by performing an operation on the first current and the fourth current, and calculates the peak power which is expected to be used in the seventh section by predicting that the second operation current will be used in the seventh section overlapping the fifth section and predicting that the third operation current will be used in the seventh section overlapping the sixth section.

9. The memory system of claim 8, wherein the controller calculates the second operation current by adding a current obtained by multiplying the third current by a third weight to a current obtained by multiplying the fourth current by a fourth weight, and calculates the third operation current by adding a current obtained by multiplying the first current by a fifth weight to a current obtained by multiplying the fourth current by a sixth weight.

10. The memory system of claim 3, wherein the controller comprises:

a command analysis unit suitable for identifying the first to fourth operations by analyzing each of the first and second commands;

a power calculation unit suitable for calculating the single power, the peak power and the total power according to the operation time points of the first to fourth operations;

a weight check unit suitable for determining the type of the selected memory die, and transferring weight information corresponding to the determination result to the power calculation unit; and an operation adjusting unit suitable for checking the result of the power calculation unit, and adjusting the operation time points of the first to fourth operations according to the check result.

11. An operation method of a memory system which includes a memory device including a plurality of memory dies, the operation method comprising:

analyzing a first command and a second command when the first and second commands are sequentially transferred to a selected memory die of the plurality of memory dies, analyzing the first command and second command including identifying first and third operations of the first command and identifying second and fourth operations of the second command, wherein the first and second operations are not able to be performed while operation sections thereof overlap each other, wherein the third operation is able to be performed while an operation section thereof overlaps an operation section of the second operation, and wherein the fourth operation is able to be performed while an operation section thereof overlaps an operation section of the first operation; and calculating a single power which is expected to be used in one or more single operation sections in which only any one respective operation of the first to fourth operations is performed, calculating an overlap power which is expected to be used in one or more overlap operation sections in which a respective plurality of operations of the of the first to fourth operations are performed while overlapping each other, calculating total power which is expected to be used when the first and second commands are performed in the selected memory die by adding the single power and the overlap power according to operation time points of the first to fourth operations, and calculating a peak power according to a largest value of the powers respectively expected to be used in the one or more overlap operation sections.

12. The operation method of claim 11, further comprising an adjusting step of adjusting the operation time points of the first to fourth operations such that the total power is minimized while the peak power calculated in the calculation step is maintained at a value smaller than a predetermined reference value.

13. The operation method of claim 12, wherein calculating the overlap power comprises:
determining values of a plurality of preset weights according to the types of the first and second commands and the type of the selected memory die,
calculating an operation current by applying the preset weights to two or more currents respectively corresponding to two or more operations which are performed while overlapping each other in one of the overlap operation sections, and
calculating the overlap power by predicting that the operation current will be used in the overlap operation section.

14. The operation method of claim 13, further comprising:
when the first command is a first write command for storing first data in the selected memory die and the second command is a second write command for storing second data in the selected memory die:
identifying, as the first operation, an operation of transferring the first data to the selected memory die and predicting that the first operation will be performed during a first section;
identifying, as the third operation, an operation in which the selected memory die physically stores the first data therein after the first section and predicting that the third operation will be performed during a second section;
identifying, as the second operation, an operation of transferring the second data to the selected memory die after the first section and predicting that the second operation will be performed during a third section overlapping the second section; and
identifying, as the fourth operation, an operation in which the selected memory die physically stores the second data therein after the second and third sections and predicting that the fourth operation will be performed during a fourth section.

15. The operation method of claim 14, further comprising:
calculating the single power by adding up a first partial power obtained by predicting that a first current corresponding to the first operation will be used in the first section, a second partial power obtained by predicting that a third current corresponding to the third operation will be used in a part of the second section that does not overlap the third section, and a third partial power obtained by predicting that a fourth current corresponding to the fourth operation will be used in the fourth section;
calculating a first operation current by performing an operation on the third current and a second current corresponding to the second operation; and
calculating the peak power by predicting that the first operation current will be used in the third section.

16. The operation method of claim 15, wherein calculating the first operation current is performed by adding a current obtained by multiplying the second current by a first weight to a current obtained by multiplying the third current by a second weight.

17. The operation method of claim 13, further comprising:
when the first command is a first read command for reading third data from the selected memory die and the second command is a second read command for reading fourth data from the selected memory die:
identifying, as the third operation, an operation in which the selected memory die physically reads the third data therein and predicting that the third operation will be performed during a fifth section;
identifying, as the first operation, an operation of receiving the third data from the selected memory die after the fifth section and predicting that the first operation will be performed during a sixth section;
identifying, as the fourth operation, an operation in which the selected memory die physically reads the fourth data therein after the third operation is started, and predicting that the fourth operation will be performed during a seventh section overlapping at least one of the fifth and sixth sections; and
identifying, as the second operation, an operation of receiving the fourth data from the selected memory die after the sixth and seventh sections and predicting that the second operation will be performed during an eighth section.

18. The operation method of claim 17, further comprising:
calculating the single power by adding up a fourth partial power obtained by predicting that a third current corresponding to the third operation will be used in a part of the fifth section that does not overlap the seventh section, a fifth partial power obtained by predicting that a first current corresponding to the first operation will be used in a part of the sixth section that does not overlap the seventh section, and a sixth partial power obtained by predicting that a second current corresponding to the second operation will be used in the eighth section;
calculating a second operation current by performing an operation on the third current and a fourth current corresponding to the fourth operation and a third operation current by performing an operation on the first current and the fourth current; and
calculating the peak power which is expected to be used in the seventh section by predicting that the second operation current will be used in the seventh section overlapping the fifth section and predicting that the third operation current will be used in the seventh section overlapping the sixth section.

19. The operation method of claim 18, further comprising:
calculating the second operation current by adding a current obtained by multiplying the third current by a third weight to a current obtained by multiplying the fourth current by a fourth weight; and
calculating the third operation current by adding a current obtained by multiplying the first current by a fifth weight to a current obtained by multiplying the fourth current by a sixth weight.

* * * * *